US012616641B2

(12) United States Patent
Hayashi et al.

(10) Patent No.: US 12,616,641 B2
(45) Date of Patent: May 5, 2026

(54) MEDICAMENT CONTAINER HAVING A FLEXIBLE SIDEWALL

(71) Applicants: Eli Lilly and Company, Indianapolis, IN (US); Fujimori Kogyo Co., Ltd., Tokyo (JP)

(72) Inventors: Yuki Hayashi, Yokohama City (JP); Masaya Nakamura, Nabari City (JP)

(73) Assignees: Eli Lilly and Company, Indianapolis, IN (US); Fujimori Kogyo Co., Ltd., Tokyo (JP)

( * ) Notice: Subject to any disclaimer, the term of this patent is extended or adjusted under 35 U.S.C. 154(b) by 306 days.

(21) Appl. No.: 18/284,972

(22) PCT Filed: Apr. 27, 2022

(86) PCT No.: PCT/US2022/026425
§ 371 (c)(1),
(2) Date: Sep. 29, 2023

(87) PCT Pub. No.: WO2022/232198
PCT Pub. Date: Nov. 3, 2022

(65) Prior Publication Data

US 2024/0164986 A1 May 23, 2024

Related U.S. Application Data

(60) Provisional application No. 63/182,073, filed on Apr. 30, 2021.

(51) Int. Cl.
*A61J 1/10* (2006.01)
*A61J 1/14* (2023.01)

(52) U.S. Cl.
CPC ............... *A61J 1/10* (2013.01); *A61J 1/1475* (2013.01); *A61J 1/1493* (2013.01)

(58) Field of Classification Search
CPC ........... A61J 1/10; A61J 1/1475; A61J 1/1493
See application file for complete search history.

(56) References Cited

U.S. PATENT DOCUMENTS

| | | |
|---|---|---|
| 5,647,511 A | 7/1997 | Bond |
| 5,749,493 A | 5/1998 | Boone et al. |
| 7,017,781 B2 | 3/2006 | Provenza |
| 7,753,233 B2 | 7/2010 | Umenaka |

(Continued)

FOREIGN PATENT DOCUMENTS

| | | |
|---|---|---|
| JP | S59-77862 | 5/1984 |
| JP | H11-35051 | 2/1999 |

(Continued)

OTHER PUBLICATIONS

International Search Report and Written Opinion mailed Jul. 27, 2022, for PCT application No. PCT/US2022/026425 filed Apr. 27, 2022.

*Primary Examiner* — Michele Kidwell
(74) *Attorney, Agent, or Firm* — Jonathan C. Anderson

(57) ABSTRACT

A medicament container including at least one sidewall and an extension is provided. The extension may be rigid in comparison to sidewalls that form the volume of the container. The extension may extend substantially into the volume of the container to a central region of the container. The container may include one or more ribs formed in the sidewalls to provide structural rigidity to the sidewalls.

27 Claims, 12 Drawing Sheets

(56) References Cited

U.S. PATENT DOCUMENTS

| | | | | |
|---|---|---|---|---|
| 8,231,273 | B2 | 7/2012 | Turvey et al. | |
| 2009/0230132 | A1* | 9/2009 | Takedutsumi ......... | B65D 77/06 383/42 |
| 2017/0327278 | A1 | 11/2017 | Berge | |
| 2018/0251254 | A1 | 9/2018 | Groot | |
| 2019/0275216 | A1 | 9/2019 | Leichner et al. | |
| 2019/0374434 | A1 | 12/2019 | Kamdar et al. | |

FOREIGN PATENT DOCUMENTS

| | | |
|---|---|---|
| JP | 2002-2736 | 1/2002 |
| JP | 2002-145287 | 5/2002 |
| JP | 2002-179102 | 6/2002 |
| JP | 2010-228764 A | 10/2010 |
| JP | 2015-193426 | 11/2015 |
| WO | 2010-004926 | 1/2010 |

* cited by examiner

FIG. 8B
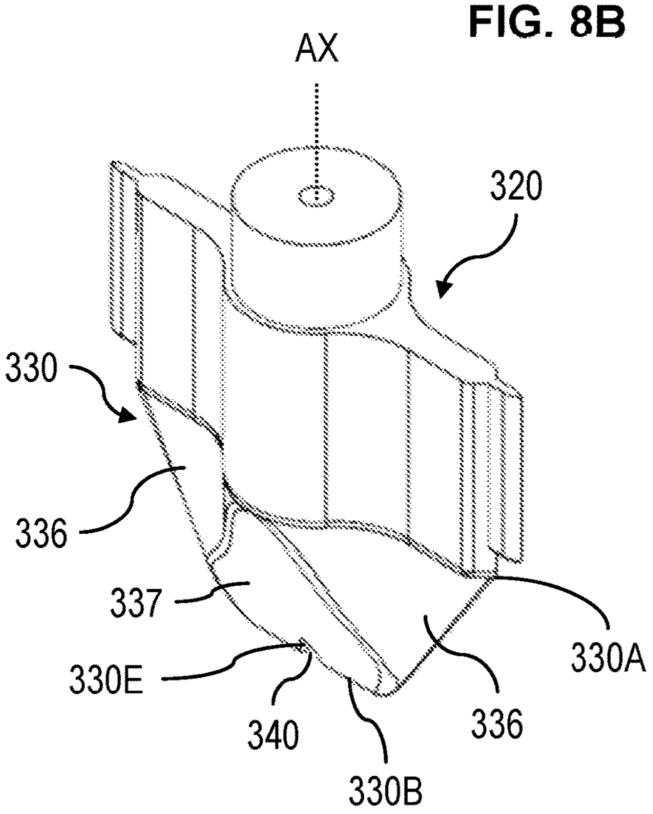
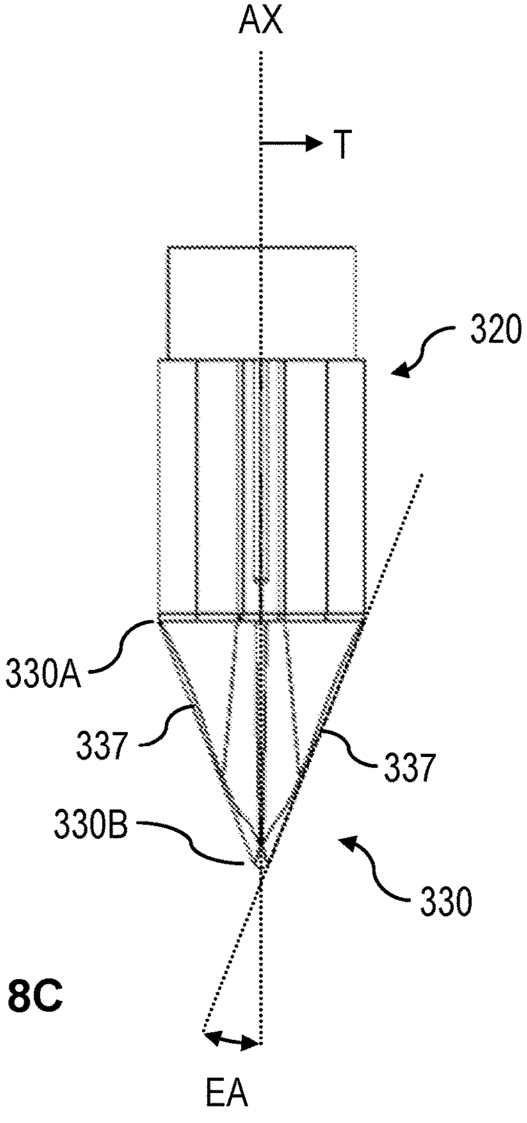
FIG. 8C

MEDICAMENT CONTAINER HAVING A FLEXIBLE SIDEWALL

FIELD

Disclosed embodiments are related to medicament containers and related methods of use.

BACKGROUND

Medicament containers are used to hold therapeutic fluid. Such therapeutic fluids may be delivered to a patient via parenteral delivery (e.g. subcutaneous injection, intramuscular injection, intravenous injection), via enteral delivery (e.g. by a gastric feeding tube or a duodenal feeding tube), or by any other suitable route of administration. Medicament containers may be configured to controllably release the therapeutic fluid for delivery into the patient. Health providers typically designate a prescribed amount of medication to be administered to the patient.

SUMMARY

In some embodiments, a medicament container comprises a sidewall, a spout coupled to the sidewall, and an extension coupled to the spout. The sidewall may at least partially define an interior volume of the medicament container. The spout may be configured for outflow of medicament from the interior volume of the medicament container. The extension may be disposed inside the interior volume of the medicament container. The sidewall may have greater flexibility than the extension such that the medicament container has a collapsed state when empty and an expanded state when full. The sidewall may be configured to move as the medicament flows out of the interior volume of the medicament container through the spout. A height of the extension measured along a central axis of the spout may be at least a fourth of the sidewall height, measured along a dimension parallel to the central axis of the spout when the medicament container is in the expanded state.

In some embodiments, a medicament container comprises a sidewall, a spout coupled to the sidewall, and an extension coupled to the spout. The sidewall may at least partially define an interior volume of the medicament container. The spout may be configured for outflow of medicament from the interior volume of the medicament container. The extension may be disposed inside the interior volume of the medicament container. The sidewall may have greater flexibility than the extension such that the medicament container has a collapsed state when empty and an expanded state when full. The sidewall may be configured to move as the medicament flows out of the interior volume of the medicament container through the spout. The extension may comprise a first end and a second end, wherein the first end is closer to the spout than the second end is to the spout. A cross-sectional area of the extension measured normal to a central axis of the spout may be greater at the first end than at the second end, wherein the central axis may be parallel to an outflow direction through the spout.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 8B is a perspective top view of the spout and extension of the medicament container of FIG. 8A;

FIG. 8C is a right side view of the spout and extension of the medicament container of FIG. 8A;

DETAILED DESCRIPTION

Figure 1:
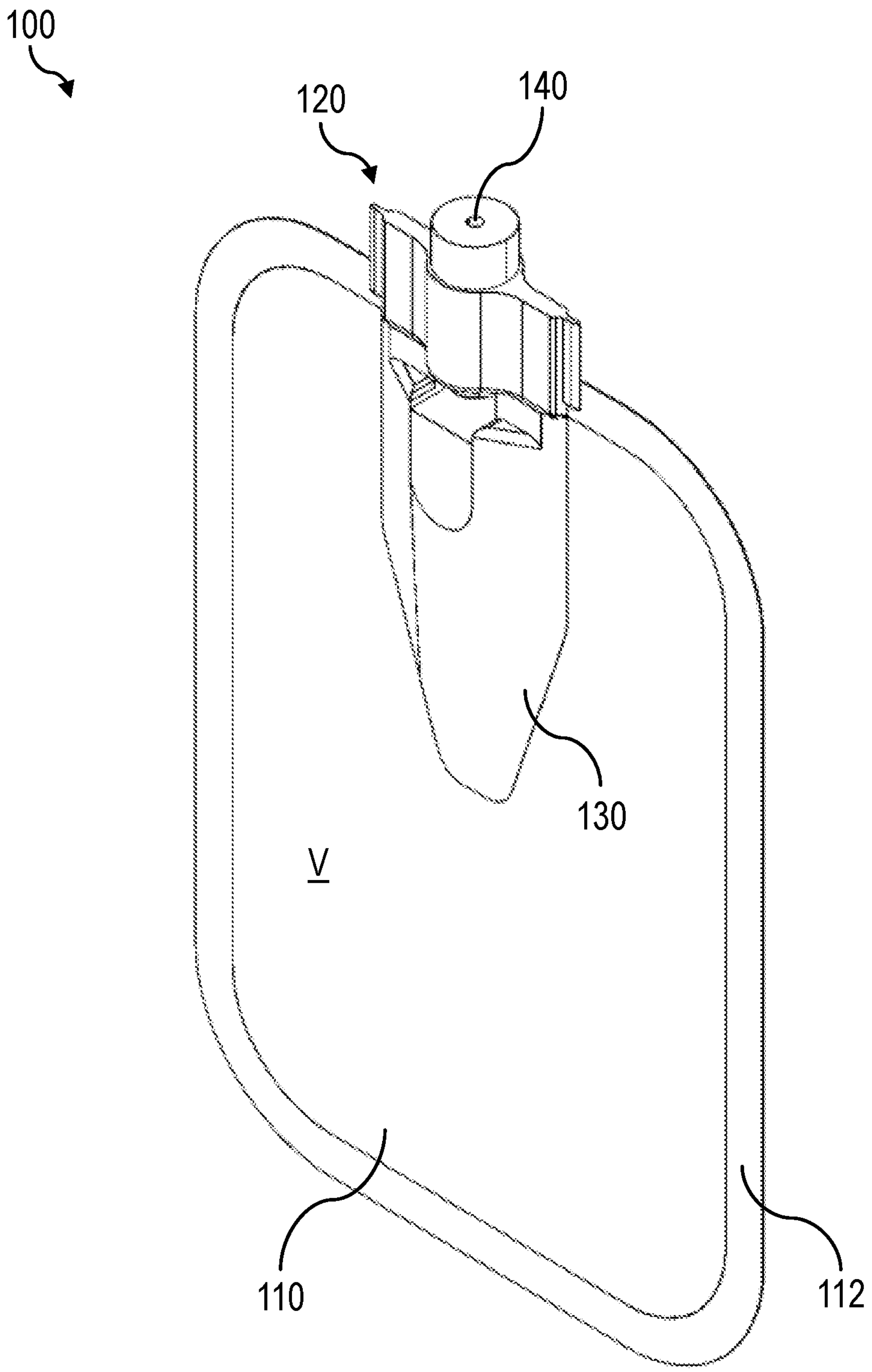
FIG. 1 is a perspective top view of one embodiment of a medicament container.

It should be understood that aspects are described herein with reference to certain illustrative embodiments and the figures. The illustrative embodiments described herein are not necessarily intended to show all aspects, but rather are used to describe a few illustrative embodiments. Thus, aspects are not intended to be construed narrowly in view of the illustrative embodiments. In addition, it should be understood that certain features disclosed herein might be used alone or in any suitable combination with other features.

Medicament containers may be arranged to move from an expanded state, wherein the container is configured to hold a fluid, to a collapsed state, wherein at least a portion of the fluid has been withdrawn from the container. In some embodiments, the movement between the two states may be enabled by flexibility of the container's sidewalls.

With conventional containers having flexible sidewalls, the flexible sidewalls (or portions of the sidewalls) may sometimes collapse prior to complete withdrawal of all fluid in the container. When the sidewalls collapse during the withdrawal of fluid from these conventional containers, it may be challenging to extract the remaining volume of fluid from the container as the fluid may be trapped between or behind collapsed portions of the container. As a result of premature or undesirable collapse of the sidewalls, a waste of the medicament or fluid remaining in the container may result. Thus, the inventors have recognized a need for an approach that assists in emptying of flexible-walled containers and reduces the likelihood of residual fluid remaining in the container following collapse of the sidewalls.

According to one aspect, a medicament container may be provided with an extension which extends into an interior volume of the medicament container. In some embodiments, a sidewall of the medicament container may at least partially define the interior volume of the medicament container. The extension may help to provide structural support to the sidewall(s) of the medicament container to prevent premature collapse. In one embodiment, the extension is a substantially flat body extending more than a quarter way, or more than halfway into the container. The extension may extend from a spout, through which fluid may flow in and/or out of the container. In some embodiments, both the spout and the extension may include coaxial passages to direct flow into and/or out of the container. In some embodiments, the extension may include grooves distributed on the surface of the extension to, e.g., guide fluid flow to the passage. In some embodiments, the container may include ribs extending from the sidewall to prevent premature collapse of the container and to direct fluid in the collapsed state toward the spout.

In some embodiments, the medicament container may be configured and arranged to contain fluid medication or any other fluid at an expanded state. Exemplary fluid medications contained in the medicament container may include one or more therapeutic agents such as insulins, insulin analogs such as insulin lispro or insulin glargine, insulin derivatives, GLP-1 receptor agonists such as dulaglutide or liraglutide, glucagon, glucagon analogs, glucagon derivatives, gastric inhibitory polypeptide (GIP), GIP analogs, GIP derivatives, combined GIP/GLP-1 agonists such as tirzepatide, oxyntomodulin analogs, oxyntomodulin derivatives, therapeutic antibodies. The therapeutic agent may be formulated with one or more excipients. In some embodiments, the container may contain another suitable fluid or a soft material, such as baby food or confectionary products, as the current disclosure is not so limited. The spout may be configured and arranged to be in fluid communication with the volume of the medicament container.

In some embodiments, the medicament container includes a sidewall and a spout. The sidewall may have a greater flexibility than the extension such that the medicament container has a collapsed state when empty and an expanded state when full.

In some embodiments, the sidewall includes a single flexible sheet folded or otherwise arranged to create a container capable of containing fluid at an expanded state. In these embodiments, the periphery of the folded flexible sheet may be joined together using any suitable method, such as thermal sealing, welding, or adhesive bonding, as the present disclosure is not so limited.

In some embodiments, the sidewall includes a plurality of flexible films capable of being reconfigured from an expanded state to a collapsed state while fluid is extracted out of the container through the spout. In some embodiments, the plurality of flexible films are capable of being reconfigured from a collapsed state to an expanded state while fluid is inserted into the container, e.g. through the spout, or through a separate inlet. In these embodiments, the plurality of flexible films, for example two flexible films, are joined at the periphery of the container using any suitable method, such as thermal sealing, welding, or adhesive bonding as the present disclosure is not so limited. In some embodiments, the sidewall is suitably bonded to the spout, such that the only outlet for the fluid within the container is through the spout. In other words, the sidewall is attached to the spout to prevent fluid transport out of the container between the sidewall and the spout. Accordingly, the extension extends into the container beyond the seam at the periphery of the sidewall. In some embodiments, the extension is substantially inside the interior volume.

In some embodiments, the spout includes a passage in fluid communication with the interior volume of the container. In some embodiments, the passage is a cylindrical opening extending through a portion of the spout, the passage having a partially or fully enclosed interior sidewall passing through the extension. However, in other embodiments, the passage may be any suitable geometry to fluidically communicate with the interior volume of the container, as the present disclosure is not so limited.

In some embodiments, the medicament container further includes an extension coupled to the spout. The extension is disposed inside the interior volume of the container. In some embodiments, the extension is configured to prevent premature collapse of the sidewall prior to the complete evacuation of the fluid from the container. In these embodiments, the extension provides a rigid support for opposing faces of the container in the collapsed state or under vacuum, to physically keep the sidewall separated. In some embodiments, the physical separation of the sidewall during emptying allows the residual fluid of the container to flow out. In some embodiments, the extension is formed as part of or integral to the spout during the manufacturing process. In other embodiments, the extension is bonded to the spout using any suitable process including thermal sealing, welding, adhesive bonding, or a mechanical means as the present disclosure is not so limited.

In some embodiments, the extension is suitably separate from the sidewall such that there may be fluid flow between the sidewall and the extension. In some embodiments, the extension extends into the interior volume of the container, beyond the point at which the container is sealed to the spout. In some embodiments, the extension is only connected to the sidewall through the spout at the expanded state of the container.

In some embodiments, the extension extends substantially into the container. In some embodiments, the extension height, measured along the central axis of the passage, is greater than one fourth of the sidewall height, measured along the central axis of the passage. In some embodiments, the extension height is greater than one half of the sidewall height. In some embodiments, the extension height is less than or equal to one fourth of the sidewall height, or any other suitable height as the present disclosure is not so limited.

In some embodiments, a shape of the body of the extension provides one or more benefits. For example, in some embodiments, the extension is shaped to help to prevent premature collapse of the sidewall under vacuum while minimizing the volume taken up by the extension inside of the container, which may reduce the total volume available for the fluid. In some embodiments, an extension may include angled edges and smooth corners. In some embodiments, smooth corners reduce the likelihood of damage to the sidewall when the extension comes into contact with the sidewall. However, it should be appreciated that other benefits provided by the shape of the extension are possible, and that the benefits identified above may not necessarily apply, as this aspect is not so limited.

In some embodiments, the extension includes a first end at the spout, and a second end located inside the interior volume of the container distal from the spout. In some embodiments, a cross-sectional area of the extension at the first end taken normal to the central axis of the passage may be greater than a cross-sectional area of the extension at the second end taken normal to the central axis of the passage. In some embodiments, the extension is continuously tapered such that the cross-sectional area of the extension along the central axis of the passage is continuously decreasing. In other embodiments, the extension includes several portions, wherein the cross-sectional area of each portion along the central axis of the passage varies based upon the portion. For example, in one embodiment, the extension includes a first portion which includes the first end and a second portion which includes the second end. In this embodiment, the cross-sectional area of the first portion is constant along the central axis, whereas the cross-sectional area of the second portion decreases along the central axis moving distally away from the spout. It should be appreciated that, in other embodiments, any suitable gradation of the cross-sectional area of any portion of the extension may be used as the present disclosure is not so limited.

In some embodiments, the cross-sectional shape of the extension is configured to allow the sidewall to significantly conform to the extension when the container is under vacuum. In some embodiments, the extension includes smooth and angled edges. In some embodiments, the cross-sectional shape of the extension does not change along the central axis of the passage, while in other embodiments, the cross-sectional shape of the extension changes along the central axis of the passage. In one embodiment, the cross-sectional shape of the extension is hexagonal at the first end, with a pair of opposing faces configured to be parallel to the sidewall. The remaining four faces are sufficiently angled to allow the sidewall to conform to the extension when the container is under vacuum. In some embodiments, the extension is significantly flat and parallel to the sidewall. For example, in an embodiment where the cross-sectional shape at the first end is hexagonal, the pair of opposing faces parallel to the sidewall are the longest sides of the hexagon. In other embodiments, the cross-sectional shape is elliptical, with the minor axis of the ellipse arranged to be normal to the sidewall when the container is in the collapsed state. It should be appreciated that the extension may have any suitable cross-sectional shape, including, but not limited to, polygonal or lens shaped, as the present disclosure is not so limited.

In some embodiments, the cross-sectional shape of the extension varies at different portions of the extension. For example, in one embodiment, the extension includes a first portion which includes the first end and a second portion which includes the second end. In this example, the cross-sectional shape of the first portion is hexagonal and the cross-sectional shape of the second portion is elliptical. In another example, the cross-sectional shape of the first portion is hexagonal and the cross-sectional shape of the second portion is lens-shaped, e.g. a vesica piscis. At the second end, the extension may taper to an edge. In embodiments where the cross-sectional shape at the first end and second end are different, the cross-sectional shape of the extension may gradually morph from the shape at the first end to the shape at the second end. The variation of cross-sectional shape of the extension along the central axis may be linear or non-linear or a combination of the two, as the present disclosure is not so limited. While any portion of the extension may include abrupt changes in either cross-sectional shape or area, in some embodiments, changes in the extension geometry may occur smoothly.

In some embodiments, the extension extends along the central axis of the passage into the container. In other embodiments, the extension is a plurality of bodies extending at various angles with respect to the central axis of the passage, as the present disclosure is not so limited. In some embodiments, the passage splits the extension into multiple portions. In some cases, this enables greater outflow of the fluid from the spout. In some embodiments, the passage of the extension has a larger cross-sectional area normal to the central axis of the passage at the spout, when compared to the passage at the spout. It should be appreciated that the extension may be any suitable shape or plurality of shapes as the present disclosure is not so limited.

In some embodiments, the passage extends directly from the spout to the second end of the extension. In some embodiments, the passage extends from the spout and split into multiple passages or channels in the extension. The multiple passages may be arranged at various angles with respect to the central axis of the passage in the spout. The distribution of a plurality of passages in the extension may fluidically connect trapped fluid at the edges of the extension with the spout, enabling greater outflow of the fluid from the spout.

In some embodiments, the extension is a solid body. In other embodiments, the extension includes internal architecture. In these embodiments, the extension may still retain structural rigidity, especially when the container is in the collapsed state, while reducing the total volumetric footprint of the extension. In some embodiments, the extension includes one or more grooves on the surface of the extension. In some embodiments, the one or more grooves are angled with respect to the central axis of the passage. In any embodiment where the extension includes grooves, the grooves may be in fluid communication with the passage at the spout. In some embodiments, the grooves serve as the plurality of passages of the extension. In some embodiments, the one or more grooves are angled with respect to the central axis of the passage at any angle between 0-90°, for example 0°, 15°, 30°, 45°, 60°, 75°, or 90°, as the present disclosure is not so limited.

In some embodiments, the geometry of the grooves are arranged to prevent the sidewall from collapsing within the groove. For example, the grooves may be large enough to allow fluid flow to and from the passage but may be small enough to prevent the sidewall from caving into the groove and blocking fluid flow. The grooves may be any suitable shape to enable fluid flow between the container and the passage, including, but not limited to, polygonal or elliptical, as the present disclosure is not so limited.

In some embodiments, the medicament container includes one or more ribs formed on the sidewall to prevent premature collapse of the sidewall prior to the complete evacuation of the fluid from the container. In some embodiments, the ribs project inwardly into the interior volume of the container. In other embodiments, the ribs project outwardly away from the interior volume of the container. In some embodiments, a combination of ribs projecting inwardly into the interior volume and ribs projecting outwardly away from the interior volume of the container is provided.

In some embodiments, the ribs are formed on one face of the sidewall whereas in other embodiments the ribs are formed on more than one face of the sidewall.

In some embodiments, the ribs and the sidewall are integrally formed as a single component, such that the single component is formed as one piece at the same time, for example with hot embossing or molding, although any suitable technique may be used to form the ribs.

In other embodiments, the ribs and the sidewall are formed separately and subsequently attached to one another. In some embodiments, the ribs are attached to an internal surface of the sidewall, such that the ribs are internal to the interior volume of the container. In some embodiments, the ribs are attached to an external surface of the sidewall, such that the ribs are external to the interior volume of the container.

As discussed herein, in some embodiments, the ribs project outwardly away from the interior volume of the container. In some embodiments, the ribs protrude out of the plane of the sidewall when the container is in the collapsed state. In some embodiments, the ribs are solid such that the rib thickness may be greater than the sidewall thickness. In some embodiments, the outwardly projecting ribs have a protruding shape with an empty void beneath such that fluid may flow inside the ribs. For example, the projecting ribs may be hollow, or may have no fill material beneath the projecting shape. In one illustrative embodiment, the cross-section of the ribs has an arched shape without fill material below the arch so that an outer surface of the ribs is convex, and an inner surface of the ribs is concave. In some embodiments, during emptying of the container, the sidewall collapses before collapse of the outwardly projecting ribs. In these embodiments, the ribs facilitate fluid flow through their empty voids. In some embodiments, the empty voids extend from the distal end of the sidewall to the spout. In some embodiments, the empty voids serve to increase an internal volume of the container.

As discussed herein, in some embodiments, the ribs project inwardly into the interior volume of the container. In some embodiments, the inwardly projecting ribs are solid such that the rib thickness may be greater than the sidewall thickness. In some embodiments, the inwardly projecting ribs include an empty void (e.g., are hollow). In some embodiments, during emptying of the container, the sidewall collapses before collapse of the inwardly projecting ribs. In these embodiments, the inwardly projecting ribs prevent the sidewall from collapsing to allow fluid flow between the inwardly projecting ribs from the distal end of the sidewall to the spout.

In some embodiments, the ribs have greater rigidity than the container sidewall. The rigidity of the ribs in comparison to the container sidewall allows the ribs to provide structural support for the sidewalls during emptying. In some embodiments, the ribs have a greater rigidity than the container sidewall due to a greater thickness. As one example, in some embodiments, the ribs are thicker than the sidewall in the normal direction of the sidewall. In some embodiments, the ribs have a greater rigidity than the container sidewall due to geometry. For example, the ribs are formed as a corrugated shape on the surface of the sidewall, which may collapse at higher vacuum than the sidewall, remaining more rigid than the sidewall at certain pressures at the collapsed state. In some embodiments, the ribs have a greater rigidity than the container sidewall due to material properties. For example, the ribs are formed of a material having a greater rigidity than a material of the sidewall. The ribs may be formed of any material or combination of materials with suitable mechanical properties that are compatible with the fluid and applications of the container. In some embodiments, the ribs have greater rigidity than the container sidewall due to any combination of the above factors.

In some embodiments, the sidewall includes a first or main rib located centrally on the sidewall. The main rib may be elongated such that the longest dimension spans the container height as described above. While the main rib may be positioned at any angle between 0-90°, for example 0°, 15°, 30°, 45°, 60°, 75°, 90° with respect to the central axis of the passage at the spout, in some embodiments, the longest dimension of the main rib is aligned with the central axis of the passage at the spout.

In some embodiments, the container includes an auxiliary or second rib extending in a direction at any angle between 0-90°, for example 0°, 15°, 30°, 45°, 60°, 75°, 90° with respect to the main rib. In some embodiments, the auxiliary rib is smaller than the main rib. In some embodiments, the container includes a plurality of auxiliary ribs and one main rib. In an example embodiment, a plurality of short auxiliary ribs is distributed radially around a main rib to redirect fluid flow along the main rib and subsequently the passage. In another example embodiment, a plurality of short auxiliary ribs lay parallel to one another and perpendicular to a plurality of main ribs distributed on the side wall. Of course, any suitable combination of auxiliary ribs and main ribs may be used as the present disclosure is not so limited.

While any rib may have any suitable shape including, but not limited to, polygonal or curved, in some embodiments, the ribs may be substantially curved and smooth. Curvature may help to prevent the accumulation of fluid next to the rib, which could lead to incomplete drainage of the container. In some embodiments, the ribs have a partially elliptical cross-section taken along a longitudinal axis of the ribs. Of course, the ribs may have any suitable cross-sectional geometry to direct fluid flow in the collapsed state, as the present disclosure is not so limited.

In some embodiments, the sidewall includes one or more portions, wherein at least a first portion includes the spout and a second portion includes the distal most edge of the sidewall relative to the spout. In these embodiments, the one or more ribs span between the first portion and the second portion. In some embodiments, the longest dimension of the one or more ribs is greater than one fourth of the sidewall height. In some embodiments, the longest dimension of the one or more ribs is greater than one third of the sidewall height. In some embodiments, the longest dimension of the one or more ribs is greater than one half of the sidewall height. In some embodiments, the longest dimension of the one or more ribs is greater than three fourths of the sidewall height. It should be appreciated that the longest dimension of the one or more ribs may be any suitable size as the current disclosure is not so limited.

In some embodiments, the container includes both an extension and one or more ribs. In these embodiments, the one or more ribs are distributed on the sidewall offset from the central axis of the passage at the spout. In one example, a container has an extension extending along the central axis of the passage and a pair of ribs located on either side of the extension. In another example, a container has an extension extending along the central axis of the passage and a pair of ribs located perpendicular to the central axis of the passage. Of course, any suitable combination of rib location or geometry may be combined with any suitable geometry of the extension, as the present disclosure is not so limited.

As described herein, in some embodiments, the sidewall is composed of materials that enable the container to be reconfigured from an expanded state to a collapsed state while fluid is extracted out of the container through the spout, and from a collapsed state to an expanded state while fluid is inserted into the container through the spout. In some embodiments, the sidewall is composed of one or more layers of polymers including, but not limited to, polypropylene (PP), polyethylene (PE), ethylene vinyl alcohol (EVOH), polyamide (PA), polychlorotrifluoroethylene (PCTFE), cyclic olefin copolymer (COC), polycarbonate (PC), ethylene vinyl acetate (EVA), polyvinyl chloride (PVC), polyvinylidene chloride (PVDC), polystyrene (PS), polyethylene terephthalate (PET), thermoplastic elastomer (TPE), polymethyl methacrylate (PMMA), or any other suitable polymer as the present disclosure is not so limited.

As described herein, in some embodiments, the spout or extension is composed of materials less flexible than the sidewall, such that the spout and extension do not move or otherwise be reconfigured while fluid is extracted out of or inserted into the container through the spout. In some embodiments, the spout is composed of one or more polymers including, but not limited to, polypropylene (PP), cyclic olefin copolymer (COC), polymethyl methacrylate (PMMA), copolyester (PCTG), polyethylene terephthalate (PET), polycarbonate (PC), polystyrene (PS), high density polyethylene (HDPE), or any other suitable polymer as the present disclosure is not so limited. In some embodiments, the spout is composed of a composite material.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein. For example, while all the embodiments described herein refer to medicament containers, the container may be configured for containing any suitable fluid, such as a beverage, as the present disclosure is not so limited.

In the exemplary embodiment of FIG. 1, the medicament container 100 includes a sidewall 110 and a spout 120. The sidewall 110 at least partially defines an interior volume V configured to contain medicament or any other fluid when the medicament container is in an expanded state. The spout 120 is in fluid communication with the interior volume of the medicament container 100.

In the illustrative embodiment of FIG. 1, the sidewall 110 is made up of two flexible sheets joined together at the periphery by a seam 112. In other embodiments, the sidewall may be made of a single flexible sheet folded or otherwise arranged to create a container capable of containing fluid at an expanded state, or more than two flexible sheets, or any other suitable arrangement.

The periphery of the sidewall may be joined together at the seam 112 using any suitable method, such as thermal sealing, welding, or adhesive bonding as the present disclosure is not so limited. In some embodiments, the sidewall is further joined to the spout to prevent fluid transport out of the container between the sidewall and the spout. The sidewall may be joined to the spout using any suitable method, such as thermal sealing, welding, or adhesive bonding as the present disclosure is not so limited.

The spout 120 illustratively includes a passage 140 fluidically connected to the interior volume of the medicament container 100. In the illustrative embodiment shown in FIG. 1, the passage 140 is a cylindrical opening extending through a fully enclosed portion of the spout's sidewall.

Medicament container 100 further includes an extension 130 connected to the spout 120. The extension 130 is positioned within the container 100 between the sidewall 110 or plurality of sidewalls. As described herein, in some embodiments, the extension 130 is separate from the sidewall 110 such that there may be fluid residing and flowing between the sidewall 110 and the extension 130 when the container 100 is at the expanded state. As shown in FIG. 1, the extension 130 extends into the container 100 beyond the seam 112 around spout 120. In some embodiments, the extension 130 is substantially inside the interior volume V. In the illustrated embodiment of FIG. 1, extension 130 extends to a central region of the volume of the container 100, such that its distal end is centrally located along the width and height of the container 100. In some embodiments, the extension 130 is configured to prevent premature collapse of the sidewall 110 prior to the complete evacuation of the fluid from the container 100. In these embodiments, the extension 130 provides a rigid support for opposing faces of the container 100 in the collapsed state or when under vacuum, to physically keep the sidewall 110 separated. In some embodiments, the physical separation of the sidewall 110 during emptying allows the residual fluid in the container 100 to flow out. As shown in FIG. 1, in some embodiments, the extension 130 is formed as part of the spout 120 during the manufacturing process. In other embodiments, the extension 130 is bonded to the spout using any suitable process including thermal sealing, welding, adhesive bonding, or a mechanical means as the present disclosure is not so limited.

Figure 3:
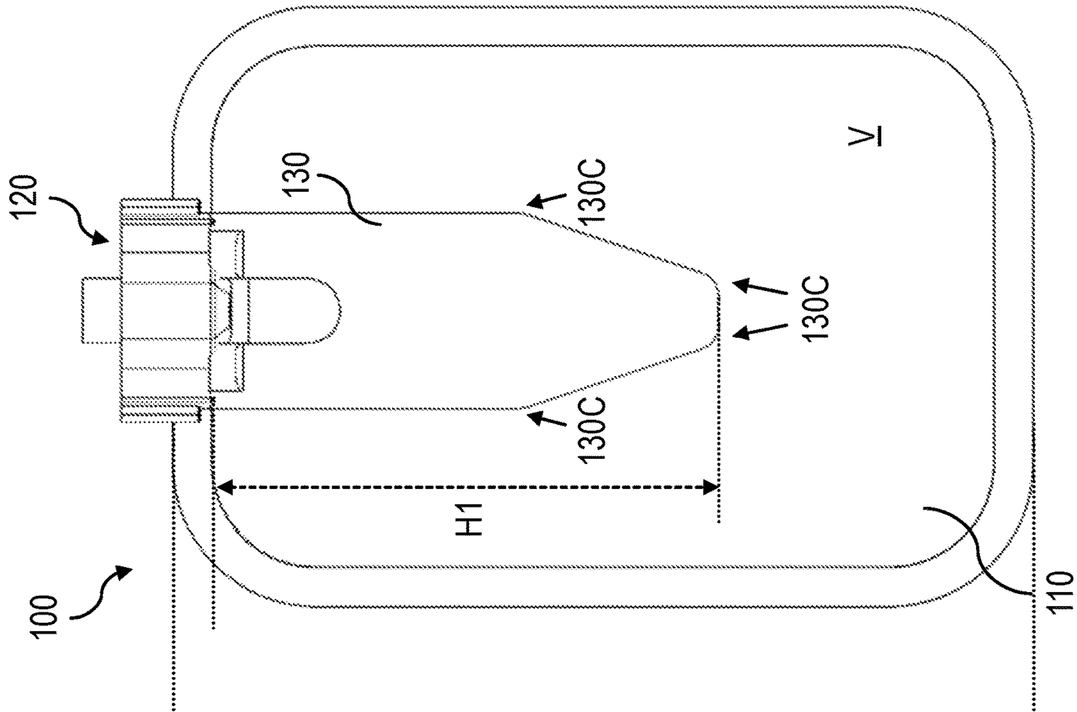
FIG. 3 is a front view of another embodiment of a medicament container.
Figure 2:
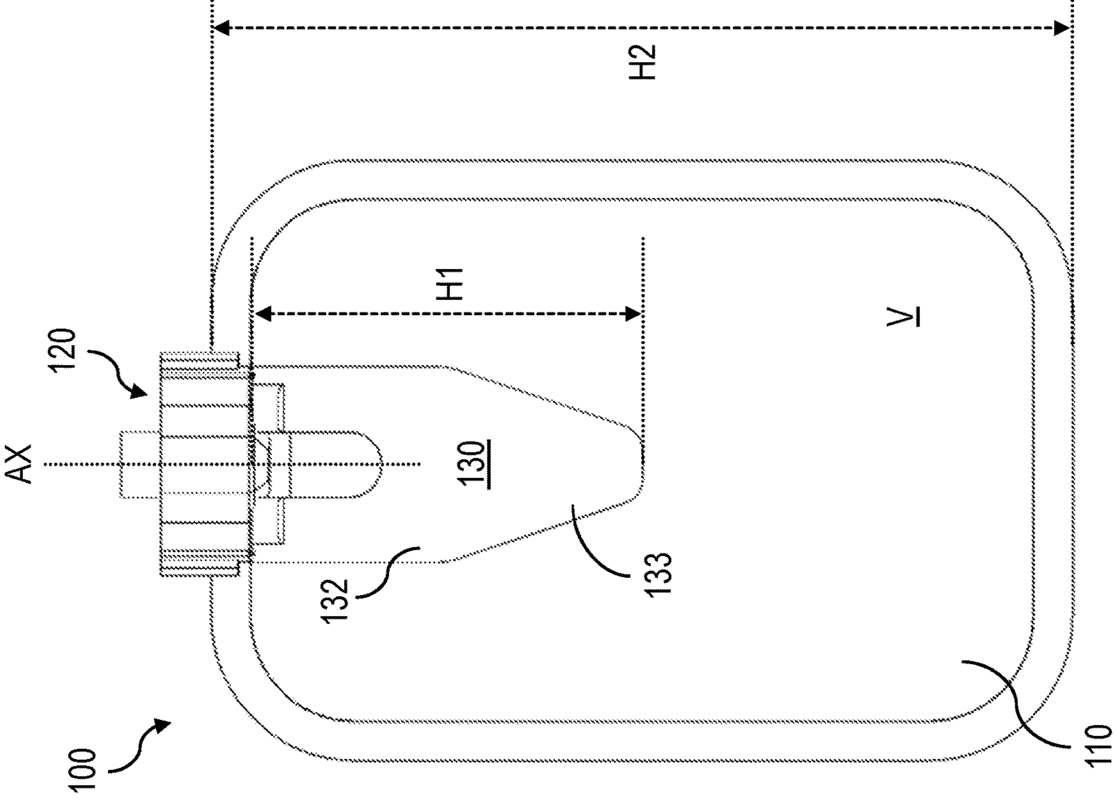
FIG. 2 is a front view of the medicament container of FIG. 1.

As shown in FIGS. 2 and 3, the extension 130 extends into the interior volume V of the container 100. In some embodiments, the extension height H1, measured along the central axis AX of the passage 140 (see FIG. 2), is at least one fourth of the sidewall height H2, measured along the central axis AX of the passage. In an exemplary embodiment, as shown in FIG. 2, the extension height H1 is approximately one half of the sidewall height H2. In some embodiments, the extension height H1 is greater than one half of the sidewall height H2. In an exemplary embodiment, as shown in FIG. 3, the extension height H1 is approximately two thirds of the sidewall height H2. In some embodiments, the extension height H1 is less than or equal to one tenth, one ninth, one eighth, one seventh, one sixth, one fifth, one fourth, two fifths, one third, one half, three fifths, three quarters, or four fifths of the sidewall height H2. In some embodiments, the extension height H1 is at least one tenth, one ninth, one eighth, one seventh, one sixth, one fifth, one fourth, two fifths, one third, one half, three fifths, three quarters, or four fifths of the sidewall height H2, or any other suitable height as the present disclosure is not so limited. In some embodiments, the extension height H1 is approximately equal to the sidewall height H2. Combinations of the above-referenced ranges are also possible. For example, in some embodiments, the extension height H1 is between one tenth and four fifths, one tenth and one half, one eight and three quarters, one fifth and four fifths, one third and two thirds, or one half and four fifths of the sidewall height H2. It should be appreciated that the extension height H1 may be any suitable height in relation to the sidewall height H2, as the present disclosure is not so limited.

In some embodiments, an extension 130 includes smooth corners 130C, as illustrated in FIG. 3. Such features may help to prevent substantial damage to the container sidewall when the sidewall contacts the extension 130.

Figure 4:
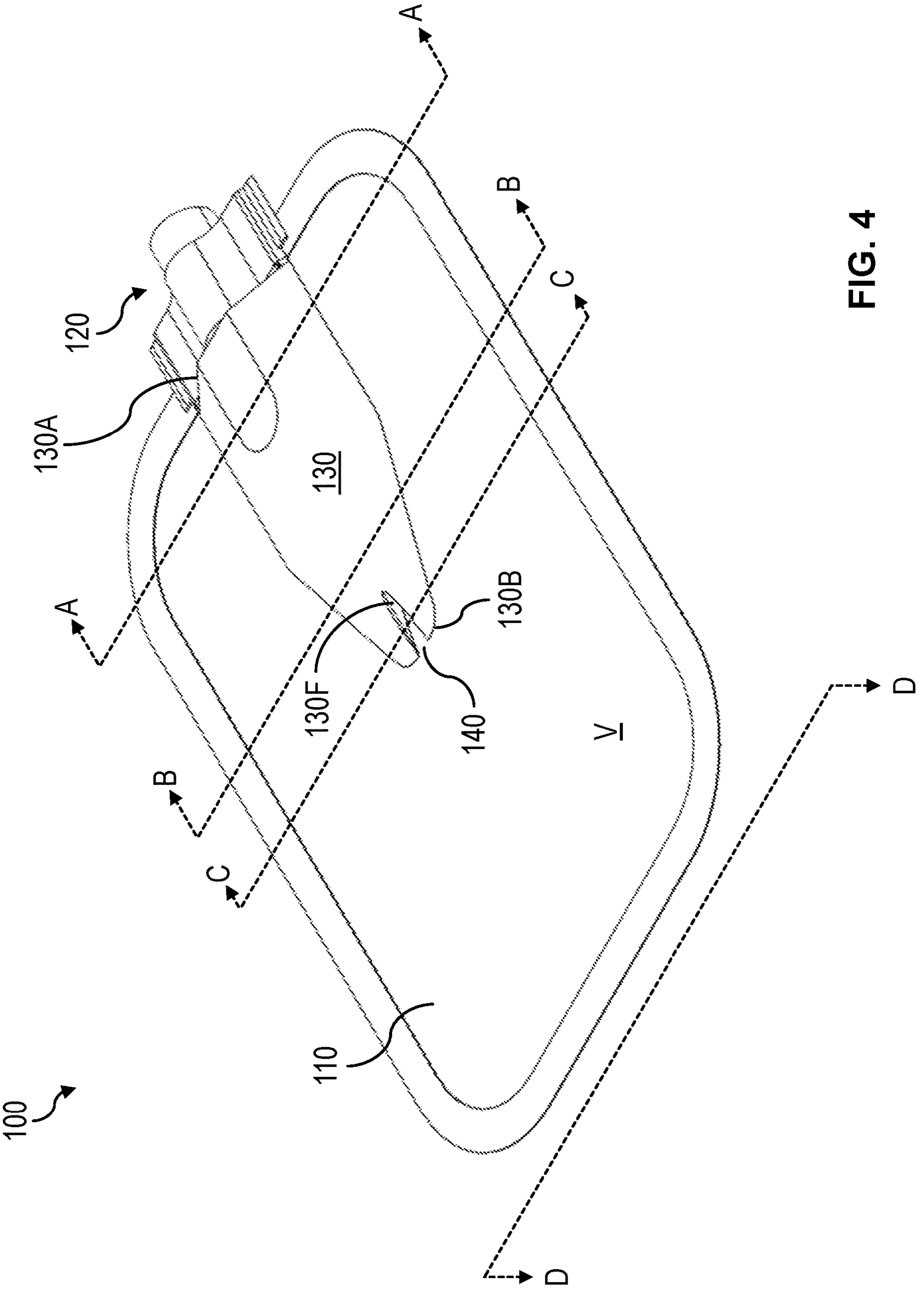
FIG. 4 is a perspective front view of yet another embodiment of a medicament container.
Figure 5A:
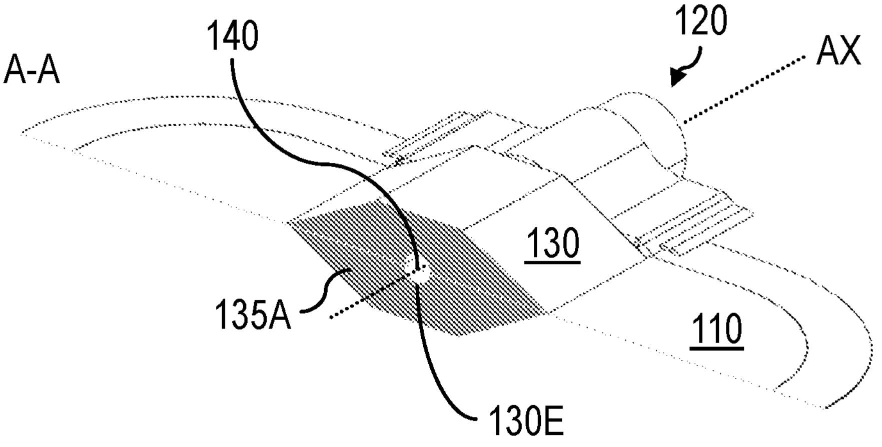
FIGS. 5A-5C are a series of perspective cross-sectional views of the medicament container of FIG. 4 taken along A-A, B-B, and C-C respectively.
Figure 5B:
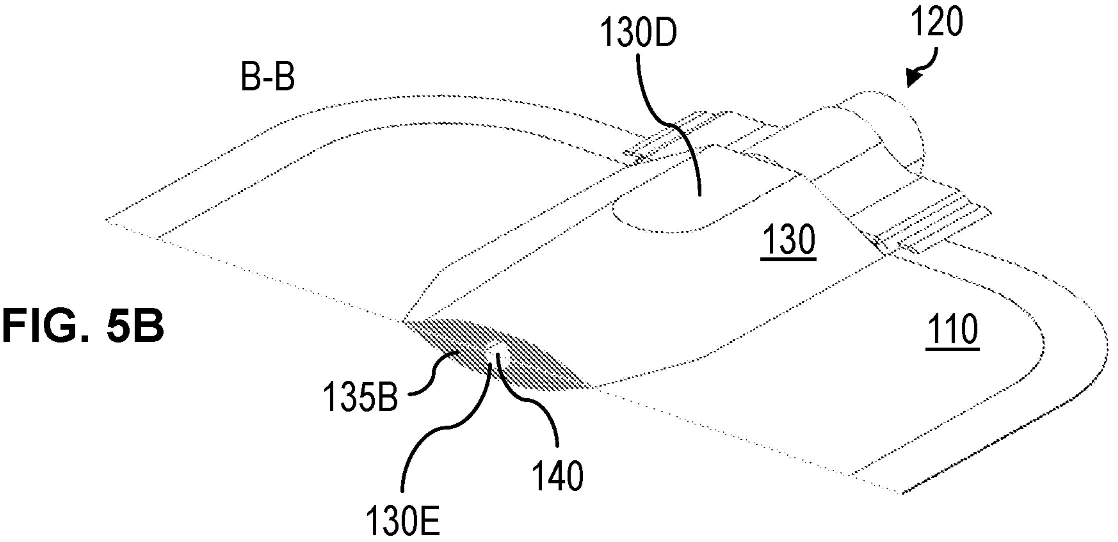

As illustrated in FIG. 4, the extension 130 includes a first end 130A at the spout 120 and a second end 130B located inside the interior volume V of container 100 distal from the spout 120. As illustrated in FIGS. 5A-5B, a first cross-sectional area 135A of a first portion 132 (see FIG. 2) of the extension taken normal to the central axis AX of the passage 140 is greater than a second cross-sectional area 135C of a second portion 133 (see FIG. 2) of the extension taken normal to the central axis AX of the passage 140. In some embodiments, the extension is continuously tapered such that the cross-sectional area of the extension along the central axis of the passage is continuously decreasing. For example, in the embodiment depicted in FIGS. 4-5C, an intermediate cross-sectional area 135B (FIG. 5B) is located between the first cross sectional area 135A (FIG. 5A) and second cross-sectional area 135C (FIG. 5C) such that the intermediate cross-sectional area 135B is less than the first cross-sectional area 135A and greater than the second cross-sectional area 135C. In other embodiments, the extension includes several integrated portions or regions, wherein the cross-sectional area of each portion along the central axis AX of the passage 140 varies from region to region. For example, in the embodiment illustrated in FIG. 6A, the extension includes a first portion 132 which includes the first end 130A and a second portion 133 which includes the second end 130B. In this embodiment, the cross-sectional area of the first portion 132 is constant along the central axis AX, whereas the cross-sectional area of the second portion 133 decreases along the central axis AX moving distally away from the spout 120. It should be appreciated that any suitable gradation of the cross-sectional area of any portion of the extension 130 may be used as the present disclosure is not so limited.

In some embodiments, the passage 140 is formed by a fully enclosed interior sidewall 130E passing through the extension 130. In these embodiments, the passage 140 is fully enclosed except for openings at the inlet and outlet ends of the passage 140. As illustrated in FIGS. 5A and 5B, the interior sidewall 130E of the extension 130 fully surrounds the passage 140. The interior sidewall 130E enables a fluid flow path between the interior volume V and the spout 120 for fluid transport in and out of the interior volume V.

Figure 5C:
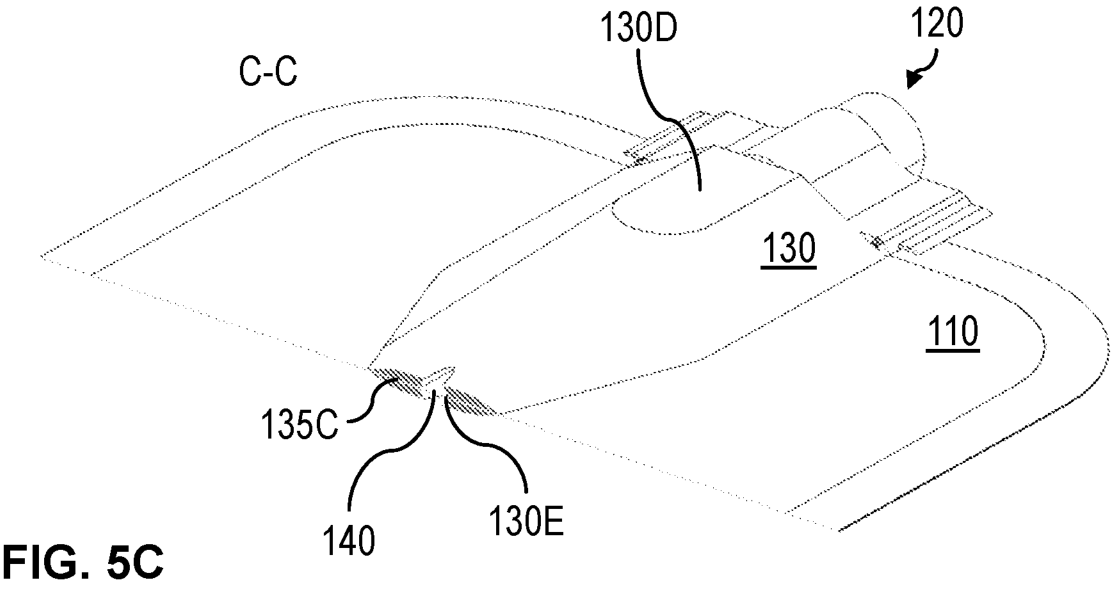

In the illustrated embodiment of FIGS. 4-5C, the interior sidewall 130E spans at least from the first end 130A to the second end 130B. It should be appreciated that the interior sidewall 130E may traverse any suitable path through the extension 130 to enable fluid transport from the interior volume V to the spout 120. In some embodiments, the passage 140 at the first end 130A exhibits similar geometric properties (e.g., cross-sectional shape) to the portion of the passage extending through spout 120, to reduce the likelihood of substantial pressure build-up between the extension 130 and the spout 120 during fluid transport.

In some embodiments, an end of the passage 140 has an opening 130F that is indented or notched into the extension 130, as depicted in FIG. 4. Passage 140 of FIG. 4 illustratively includes an opening 130F that is V-shaped and indented into the extension 130, such that the second end 130B is forked into two portions. Due to the forked shape, the interior sidewall 130E is only partially enclosed at second end 130B as illustrated in FIGS. 4 and 5C. Opening 130F may extend any suitable distance from the distal end 130B towards the spout 120. It should be appreciated that any degree of enclosure of the passage 140 by the interior sidewall 130E may be used as the present disclosure is not so limited. The opening of the passage 140 with notched opening 130F may allow for greater fluid flow from the interior volume V into the passage 140 and to the spout 120.

It should be appreciated that any shape for the opening 130F of the passage 140 may be used as the present disclosure is not so limited.

Figure 6A:
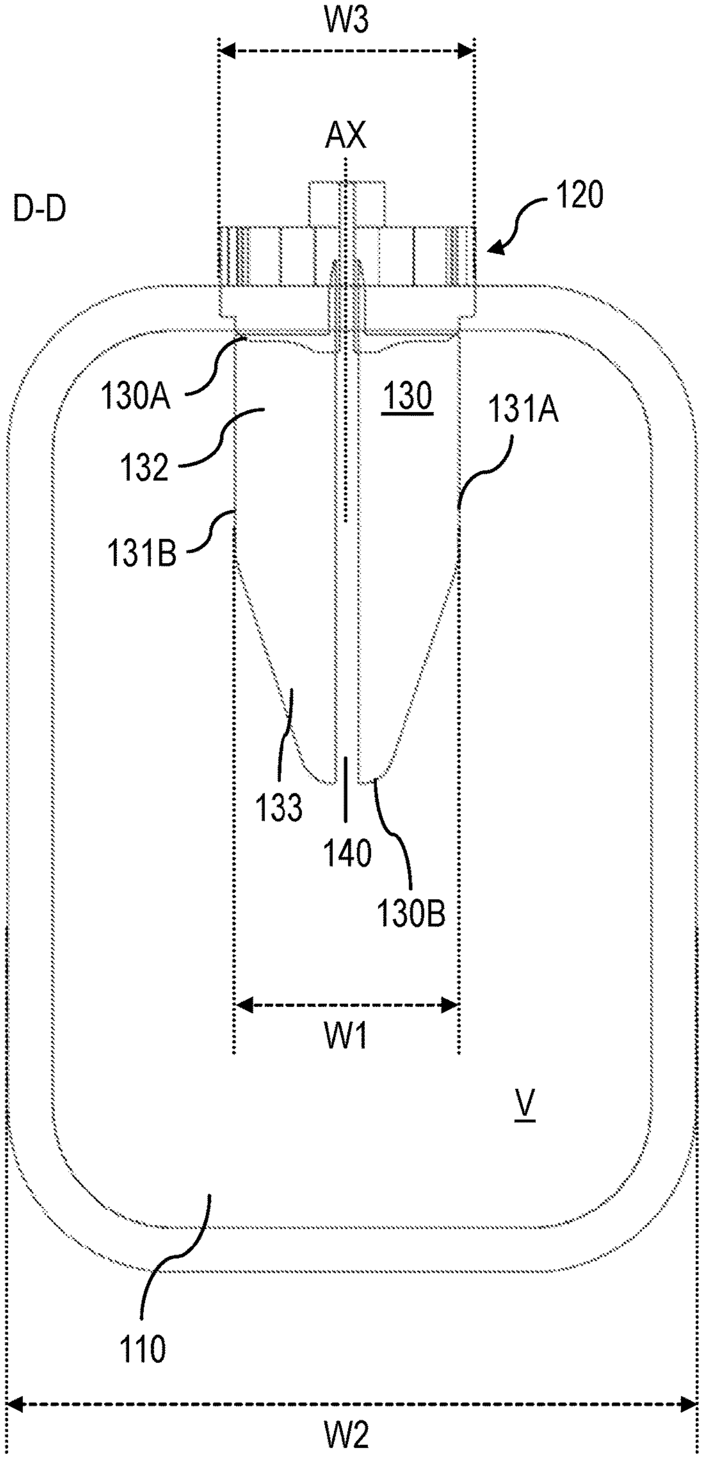
FIG. 6A is a cross-sectional view of the medicament container of FIG. 4 taken along D-D.

Referring to FIG. 6A, an extension 130 includes edges 131A, 131B spaced from the passage 140. The edges are located at opposing sides of the central axis AX such that a first edge 131A is situated on one side of the central axis AX and the second edge 131B is situated on the opposing side of the central axis. Illustratively, a portion of the edges 131A, 131B are angled with respect to the central axis AX, and a portion of the edges 131A, 131B are parallel to the central axis AX. In particular, as shown in FIG. 6A, the edges 131A, 131B of the first portion 132 are parallel to the central axis AX, whereas the edges 131A, 131B of the second portion 133 are angled with respect to the central axis AX such that the second portion 133 has a tapering width W1. In some embodiments, due to the tapering width W1 of the second portion 133, the cross-sectional area of the second portion 133 changes along the central axis AX. In other embodiments, the edges of the extension are parallel to the central axis AX for the entire length of the extension. It should be appreciated that any angle between 0-90°, inclusive, for example 0°, 15°, 30°, 45°, 60°, 75°, or 90° of the edges 131A, 131B with respect to the central axis AX may be used as the present disclosure is not so limited. In some embodiments, the edges 131A, 131B may be mirrored along the central axis AX (e.g. the extension may be symmetric about the central axis AX), whereas in other embodiments the edges 131A, 131B may be asymmetric about the central axis AX.

In some embodiments, as shown in FIGS. 1-6B, the extension 130 may be centrally located relative to the sidewall width W2. In other words, the central axis AX of the container may run through the length of the extension, illustratively through a center of the extension.

As illustrated in FIGS. 1-6B, the extension 130 is centrally located along the central axis AX. In embodiments where the central axis AX is located halfway across the sidewall width W2, as shown in FIG. 6A, the second end 130B may also be located approximately halfway along the sidewall width W2 and therefore aligned along axis AX. Accordingly, in some embodiments, the container 100, including the sidewall 110, spout 120, and the extension 130 may be mirrored across the central axis AX. When the extension 130 is located midway along the sidewall width W2, the edges 131A, 131B are equidistant from the periphery of the sidewall 110. Although the extension 130 is centrally located across the sidewall width W2 in some embodiments, the extension 130 may be located at any position along the sidewall width W2 or offset from axis AX as the present disclosure is not so limited.

In FIG. 6A, the extension width W1 at the first end 130A is less than the sidewall width W2. Illustratively, extension width W1 is about one third of the sidewall width W2. In other embodiments, the extension width W1 is approximately one half of the sidewall width W2. In other embodiments, the extension width W1 is at least one fifth, one fourth, one third, two fifths, one half, three fifths, two thirds, or three fourths of the sidewall width W2. In some embodiments, the extension width W1 may be less than one fifth of the sidewall width W2. Combinations of the above-referenced ranges are also possible. For example, the extension width W1 may be between one fifth and three fourths, one fourth and two thirds, one third and two thirds, one third and one half, or one fifth and three fifths of the sidewall width W2. It should be appreciated that the extension width W1 may be any width in relation to the sidewall width W2, as the present disclosure is not so limited.

In the illustrative embodiment of FIG. 6A, the extension width W1 is less than a spout width W3. In some embodiments, the extension width W1 at the first end 130A is at least two thirds of the spout width W3. In some embodiments, the extension width W1 is at least one fifth, one fourth, one third, two fifths, one half, three fifths, two thirds, or three fourths of the spout width W3. In some embodiments, the extension width W1 is less than three fourths, two thirds, three fifths, one half, two fifths, one third, one fourth or one fifth of the spout width W3. Combinations of the above-referenced ranges are also possible. For example, the extension width W1 may be between one fifth to three fourths, one fourth to two thirds, one third to two thirds, one third to one half, or one fifth to three fifths of the spout width W3. In some embodiments, the extension width W1 is approximately equal to the spout width W3. It should be appreciated that the extension width W1 may be any width in relation to the spout width W3, as the present disclosure is not so limited.

In other embodiments, the extension width W1 may be greater than a spout width W3. For example, the spout width W3 may be at least one fifth, one fourth, one third, two fifths, one half, three fifths, two thirds, or three fourths of the extension width W1. In some embodiments, the spout width W3 may be less than one fifth, one fourth, one third, two fifths, one half, three fifths, two thirds, or three fourths of the extension width W1. Combinations of the above-referenced ranges are also possible. For example, the spout width W3 may be between one fifth to three fourths, one fourth to two thirds, one third to two thirds, one third to one half, or one fifth to three fifths of the extension width W1. It should be appreciated that the spout width W3 may be any width in relation to the extension width W1, as the present disclosure is not so limited.

Figure 6B:
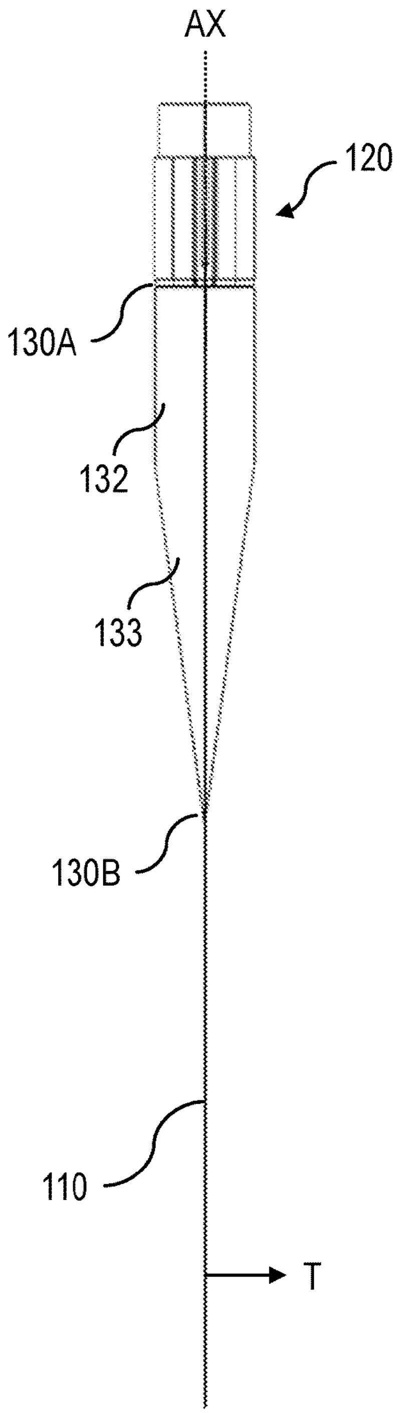
FIG. 6B is a right side view of the medicament container of FIG. 4.

In some embodiments, the change in cross-sectional area of the extension 130 along the central axis AX may be due, in whole or in part, to a reduction in the thickness of the extension 130 in the direction T, normal to the sidewall 110, as shown in FIG. 6B. In the illustrated embodiment, the thickness of the first end 130A is approximately equal to the thickness of the spout 120, and the thickness of the first portion 132 of the extension 130 is greater than the thickness of the second portion 133. In FIG. 6B, the thickness of the first portion 132 is constant along the central axis AX. In other embodiments, however, the thickness of the first portion 132 may decrease in the direction distal to the spout 120 along the central axis AX. In the illustrated embodiment, the thickness of the second portion 133 varies along the central axis AX, and in particular illustratively decreases in the direction distal to the spout 120 along the central axis AX. It should be appreciated that the thickness profile of the extension 130 may be any suitable shape as the present disclosure is not so limited.

It should be appreciated that the change in the cross-sectional area of the extension 130 may be due to any combination of tapering width W1 and tapering thickness T, as illustrated in FIGS. 6A and 6B.

In the illustrated embodiment, the cross-sectional shape of the extension 130 is configured to allow the sidewall 110 to significantly conform to the extension 130 when the container 100 is collapsed or under vacuum. In some embodiments, the cross-sectional shape of the extension 130 may not change along the central axis AX of the passage, while in other embodiments, the cross-sectional shape of the extension 130 may change along the central axis AX of the passage. In one embodiment depicted in FIGS. 5A-5C, the cross-sectional shape 135A of the first portion 132 of the extension 130 is hexagonal, with a pair of opposing faces configured to be parallel to the sidewall 110. The first portion 132 may include a pair of faces 130D (only one face visible in FIG. 5C) parallel with the central axis AX. The remaining four faces may be sufficiently angled with respect to the parallel faces 130D to allow the sidewall 110 to conform to the extension when the container 100 is under vacuum. In some embodiments, the extension 130 may be substantially flat and parallel to the sidewall 110. For example, in an embodiment where the cross-sectional shape 135A of the first portion 132 is hexagonal, the pair of faces 130D parallel to the sidewall are the longest sides of the hexagon, as shown in FIG. 5A. In other embodiments, the cross-sectional shape may be elliptical, with the minor axis of the ellipse arranged to be normal to the sidewall when the container is in the collapsed state. Any cross-sectional shape of the extension may have any suitable shape, including, but not limited to, polygonal or lens shaped, as the present disclosure is not so limited.

In some embodiments, the cross-sectional shape of the extension may vary at different portions of the extension 130. For example, in one embodiment depicted in FIGS. 4-6B, the extension 130 includes a first portion 132 which includes the first end 130A and a second portion 133 which includes the second end 130B. In this example, the cross-sectional shape 135A of the first portion 132 is hexagonal, as illustrated in FIG. 5A, and the cross-sectional shape 135C of the second portion 133 is lens-shaped, e.g. a vesica piscis, as illustrated in FIG. 5C. In another example, the cross-sectional shape of the first portion 132 is hexagonal and the cross-sectional shape of the second portion 133 is elliptical. As illustrated in FIG. 4, the extension may taper to an edge at the second end 130B. In embodiments where the cross-sectional shape at the first end 130A and second end 130B are different, the cross-sectional shape of the extension 130 may gradually transition from the shape at the first end to the shape at the second end, as illustrated in FIGS. 5A-5C. The variation of cross-sectional shape of the extension 130 along the central axis AX may be linear, non-linear or a combination of the two, as the present disclosure is not so limited. The extension 130 may include step-wise and/or gradual changes in cross-sectional area.

Figure 7A:
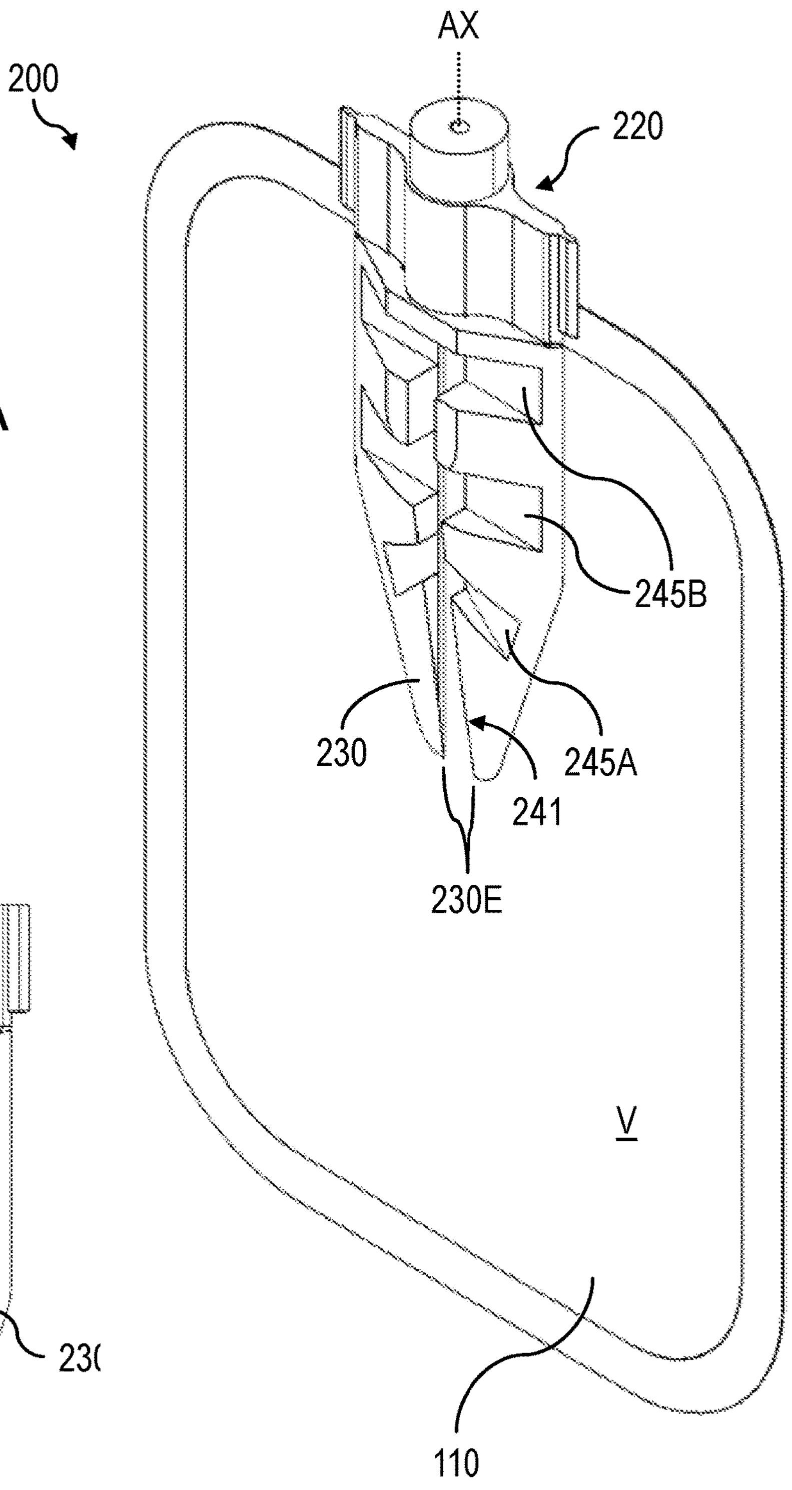
FIG. 7A is a perspective top view of yet another embodiment of a medicament container.
Figure 7B:
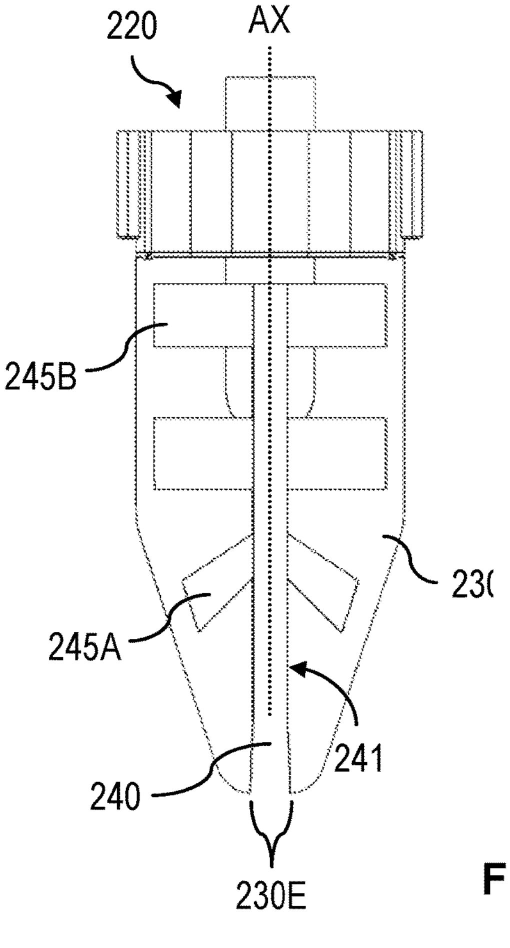
FIG. 7B is a front view of the extension of the medicament container of FIG. 7A.

FIGS. 7A and 7B illustrate another exemplary embodiment of a container 200 having a spout 220 and an extension 230. As illustrated in FIGS. 7A and 7B, the extension 230 extends along the central axis AX of the passage 240 into the interior volume V of the container 200. The passage 240 may split the extension 230 into multiple portions. The extension 230 of the embodiments shown in FIG. 7A includes a first half positioned on one side of the central axis AX and a second half positioned on an opposing side of the central axis, with each half extending distally into the container from the spout 220. Illustratively, passage 240 is not fully enclosed along the height of extension 230. Rather, the interior sidewall 230E of extension 230 only partially encloses the passage 240, and passage 240 opens into the volume of the container along the height of the extension 230 (FIG. 7A). As such, the passage 240 is in fluid communication with the interior volume V at several points along the height of the extension 230. In some embodiments, the opened passage 240 serves to enable greater outflow of the fluid from interior through the spout 220. In these embodiments, the passage 240 of the extension 230 may have a larger cross-sectional area (normal to the central axis AX) than the passage through the spout 220 due to the partial enclosure of passage 240. It should be appreciated that the passage 240 may be any suitable shape or plurality of shapes as the present disclosure is not so limited.

In the embodiment of FIGS. 7A and 7B, the extension 230 includes a plurality of grooves 245A, 245B formed along the height of extension 230. In this embodiment, the extension 230 still provides structural support to the container sidewall(s) 110 upon collapse, while reducing the total volumetric footprint of the extension 230. Grooves 245A, 245B are formed in the surface of the extension 230. In some embodiments, the grooves 245A, 245B are in fluid communication with the passage 240. The grooves 245A, 245B may serve as a plurality of additional passages of the extension 230 each feeding into main passage 240. In some embodiments, the one or more grooves 245A, 245B may be angled with respect to the central axis AX of the passage 240 at any angle between 0-90°, inclusive, for example 0°, 15°, 30°, 45° (as with grooves 245A in FIG. 7B), 60°, 75°, or 90° (as with grooves 245B in FIG. 7B), as the present disclosure is not so limited.

Figure 8A:
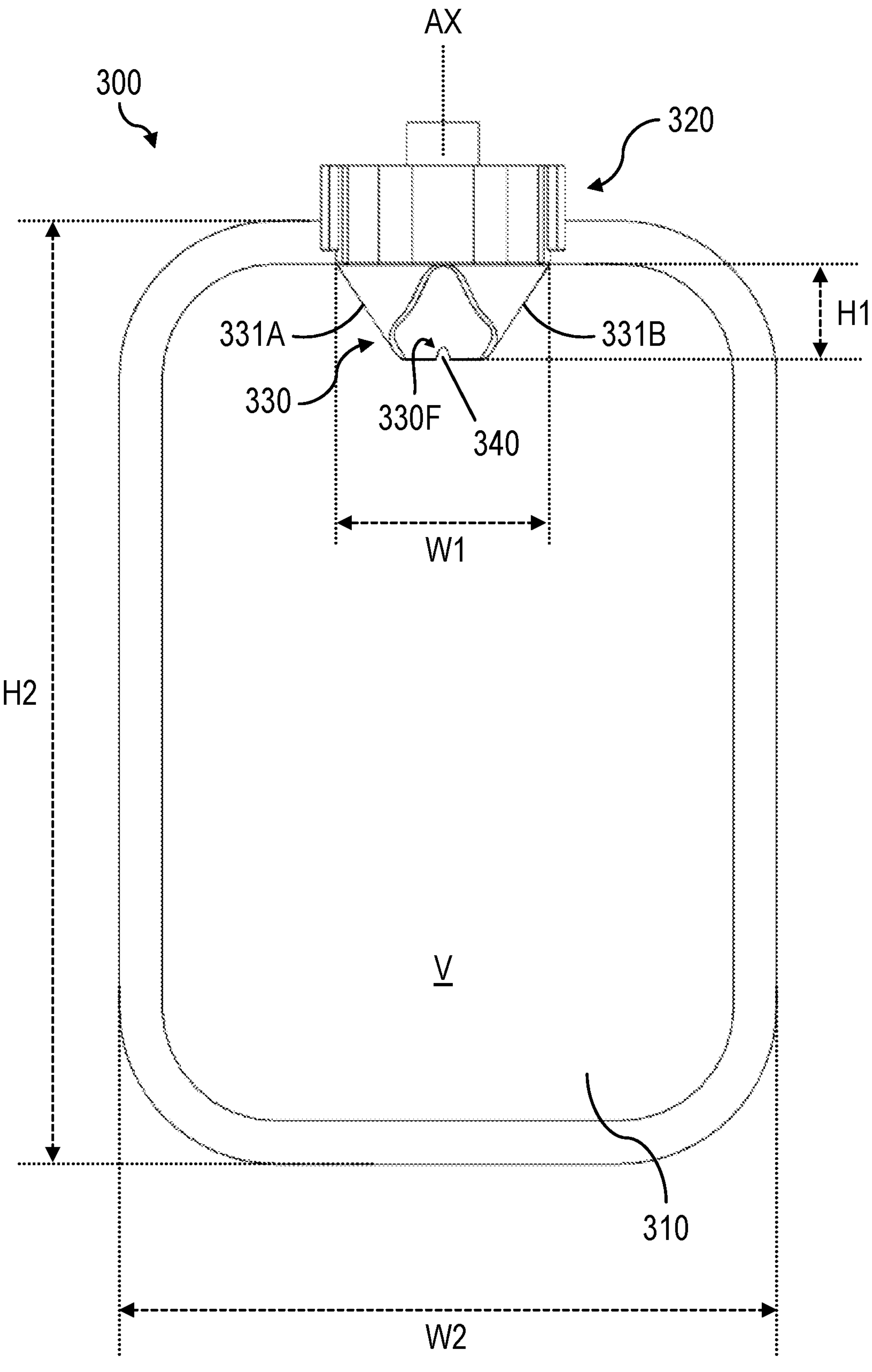
FIG. 8A is a front view of yet another embodiment of a medicament container.

In some embodiments, the extension height H1 may be less than one half of the sidewall height. For example, an alternative embodiment of a medicament container 300, spout 320, and extension 330 is illustrated in FIGS. 8A-8C, wherein the extension has a reduced height which thereby increases the available space in the interior volume V of the medicament container 300 for fluid containment. The reduced height extension provides a rigid support for opposing faces of the container in the collapsed state or when under vacuum, as previously described for other embodiments of the extension.

The height of the extension of FIGS. 8A-8C is less than one fourth of the sidewall height H2. In particular, the extension height H1 in FIG. 8A is about one tenth of the sidewall height H2. In other embodiments, the extension height H1 may be less than two fifths, one third, one fourth, one fifth, one sixth, one seventh, one eighth, one ninth or one tenth of the sidewall height H2. Combinations of the above-referenced ranges are also possible. For example, the extension height H1 may be between one tenth to three fourths, one eighth to two thirds, one third to two thirds, one third to one half, or one fifth to three fifths of the sidewall height H2. It should be appreciated that the extension height H1 may be any width in relation to the sidewall height H2, as the present disclosure is not so limited.

As shown in FIG. 8A, the extension height H1 may be less than an extension width W1 in some embodiments. In some embodiments, the extension height H1 may be at least one tenth, one ninth, one eighth, one seventh, one sixth, one fifth, one fourth, one third, two fifths, one half, three fifths, two thirds, or three fourths of the extension width W1. In some embodiments, the extension height H1 may be less than three fourths, two thirds, three fifths, one half, two fifths, one third, one fourth, one fifth, one sixth, one seventh, one eighth, one ninth, or one tenth of the extension width W1. Combinations of the above-referenced ranges are also possible. For example, the extension height H1 may be between one tenth to three fourths, one eighth to two thirds, one third to two thirds, one third to one half, or one fifth to three fifths of the extension width W1. It should be appreciated that the extension height H1 may be any width in relation to the extension width W1, as the present disclosure is not so limited.

In other embodiments, the extension height H1 may be approximately equal to the extension width W1. In other embodiments still, the extension height H1 may be greater than the extension width W1, as illustrated in FIGS. 1-7B. In some embodiments, the extension width W1 may be at least one tenth, one ninth, one eighth, one seventh, one sixth, one fifth, one fourth, one third, two fifths, one half, three fifths, two thirds, or three fourths of the extension height H1. In some embodiments, the extension width W1 may be less than three fourths, two thirds, three fifths, one half, two fifths, one third, one fourth, one fifth, one sixth, one seventh, one eighth, one ninth, or one tenth of the extension height H1.

Combinations of the above-referenced ranges are also possible. For example, the extension width W1 may be between one tenth to three fourths, one eighth to two thirds, one third to two thirds, one third to one half, or one fifth to three fifths of the extension width H1. In some embodiments, the extension width W1 is one third of the extension height H1. It should be appreciated that the extension height H1 may be any width in relation to the extension width W1, as the present disclosure is not so limited.

Referring to FIGS. 8A-8C, the extension 330 include edges 331A, 331B spaced from the passage 340. The edges are located at opposing sides of the central axis AX such that a first edge 331A is situated on one side of the central axis AX and the second edge 331B is situated on the opposing side of the central axis. In some embodiments, a substantial portion of the edges 331A, 331B may be angled with respect to the central axis AX, as shown in FIG. 8A. In other embodiments, as described previously, a portion of the edges 331A, 331B may be angled with respect to the central axis AX, and a portion of the edges 331A, 331B may be parallel to or at a different angle relative to the central axis AX. Any angled portion of the edges 331A, 331B may be angled with respect to the central axis AX such that the extension 330 has a tapering width W1. It should be appreciated that any angle between 0-90°, inclusive, for example 0°, 15°, 30°, 45°, 60°, 75°, or 90° of the edges 331A, 331B with respect to the central axis AX may be used as the present disclosure is not so limited. In some embodiments, the edges 331A, 331B may be mirrored across the central axis AX (e.g. the extension may be symmetric about the central axis AX) whereas in other embodiments, the edges 331A, 331B may not be mirrored across the central axis AX (e.g. the extension may be asymmetric about the central axis AX).

As illustrated in FIG. 8B, the extension 330 includes a pair of opposing curved faces 336 extending from spout 320. In the embodiment depicted in FIG. 8B, the curved faces 336 of the extension 330 include concave surfaces at the first end 330A to generally conform to the shape of the spout 320. Extension 330 includes a generally cylindrical interior sidewall 330E forming the passage 340.

Extension 330 also includes a pair of opposed planar faces 337, as shown in FIGS. 8B and 8C. In some embodiments, the planar faces 337 may span from the first end 330A to the second end 330B of the extension 330, while in other embodiments, the planar faces 337 may only partially span between the first end 330A and the second end 330B.

In some embodiments, as shown in the side view of FIG. 8C, the extension 330 may have a thickness T that decreases along the central axis AX in the direction away from the spout 320. In some embodiments, the thickness of the first end 330A may be approximately equal to the thickness of the spout 320. In some embodiments, the thickness of the second end 330B may be less than or equal to the thickness of the first end 330A. In some embodiments, the thickness T of a portion of the extension 330 may linearly decrease along the central axis AX and may form a tapered end. As an example, in some embodiments, the extension 330 may include the planar faces 337 as described above, where the planar faces 337 are angled relative to the central axis AX to form a linearly decreasing thickness. For example, the planar faces 337 may be angled with respect to the central axis AX at an angle EA, as shown in FIG. 8C, that may be any angle between 0-90°, inclusive, for example 0°, 15°, 30°, 45°, 60°, 75°, or 90°.

In other embodiments, the thickness T of a portion of the extension 330 may non-linearly decrease along the central axis AX. In yet other embodiments, the thickness T of the extension 330 may remain constant throughout the extension 330. For example, the planar faces 337 may be parallel with the central axis AX, and parallel to one another.

In some embodiments, the thickness T of the extension 330 may change both linearly and non-linearly along the central axis AX. In some embodiments, the thickness of the extension 330 may decrease along the central axis AX such that the second end 330B is an edge, as illustrated in FIG. 8C. In these embodiments, opposing faces of the sidewall 310 may come into contact with one another near the second end 330B during evacuation of the container 300.

In some embodiments, any combination of the planar faces 337 or the curved surfaces 336 may include radial, chamfered, or any other smooth corners to prevent damage to the sidewall 310 when the extension 330 comes into contact with the sidewall 310.

In some embodiments, the extension 330 may be symmetric about the central axis AX. In other embodiments, the extension 330 may be asymmetric about the central axis AX. In embodiments where the extension 330 is asymmetric about the central axis AX, there may be two distinct extension angles defining the angle between the central axis AX and the opposing faces of the extension 330. In these embodiments, it should be appreciated that any face of the extension 330 with respect to the central axis AX may be angled between 0-90°, inclusive, for example 0°, 15°, 30°, 45°, 60°, 75°, or 90° as the present disclosure is not so limited. As shown in FIG. 8C, the second end 330B may be smooth for manufacturing or operational purposes.

Referring again to FIGS. 8A and 8B, the passage 340 may have an opening 330F that is indented or notched into the extension 330. For example, opening 330F may be an inverted U shape. The expansion of the passage 340 with the opening 330F may allow for greater fluid flow from the interior volume V to the spout 120, as described previously. It should be appreciated that any shape for the opening 330F or interior sidewall 330E of the passage 340 may be used as the present disclosure is not so limited. It should be appreciated that any degree of enclosure of the passage 340 by the extension 330 may be used as the present disclosure is not so limited.

In some embodiments, medicament container includes one or more ribs that reduce the likelihood of premature collapse of the container sidewall prior to container emptying. The ribs may provide rigid support for opposing faces of the container 100 in the collapsed state or under vacuum, to physically keep the sidewall separated until the container is emptied. In some embodiments, the physical separation of the sidewall with the rib during emptying may allow the residual fluid of the container to flow out. In some embodiments, the ribs may be dispersed at various locations around the container. In some embodiments, the ribs may be located distal to the spout such that premature collapse of the container prior to outflow of the residual fluid is reduced. In some embodiments, the ribs may be formed to direct residual fluid flow from distal locations in the interior volume V to the spout.

Figure 9A:
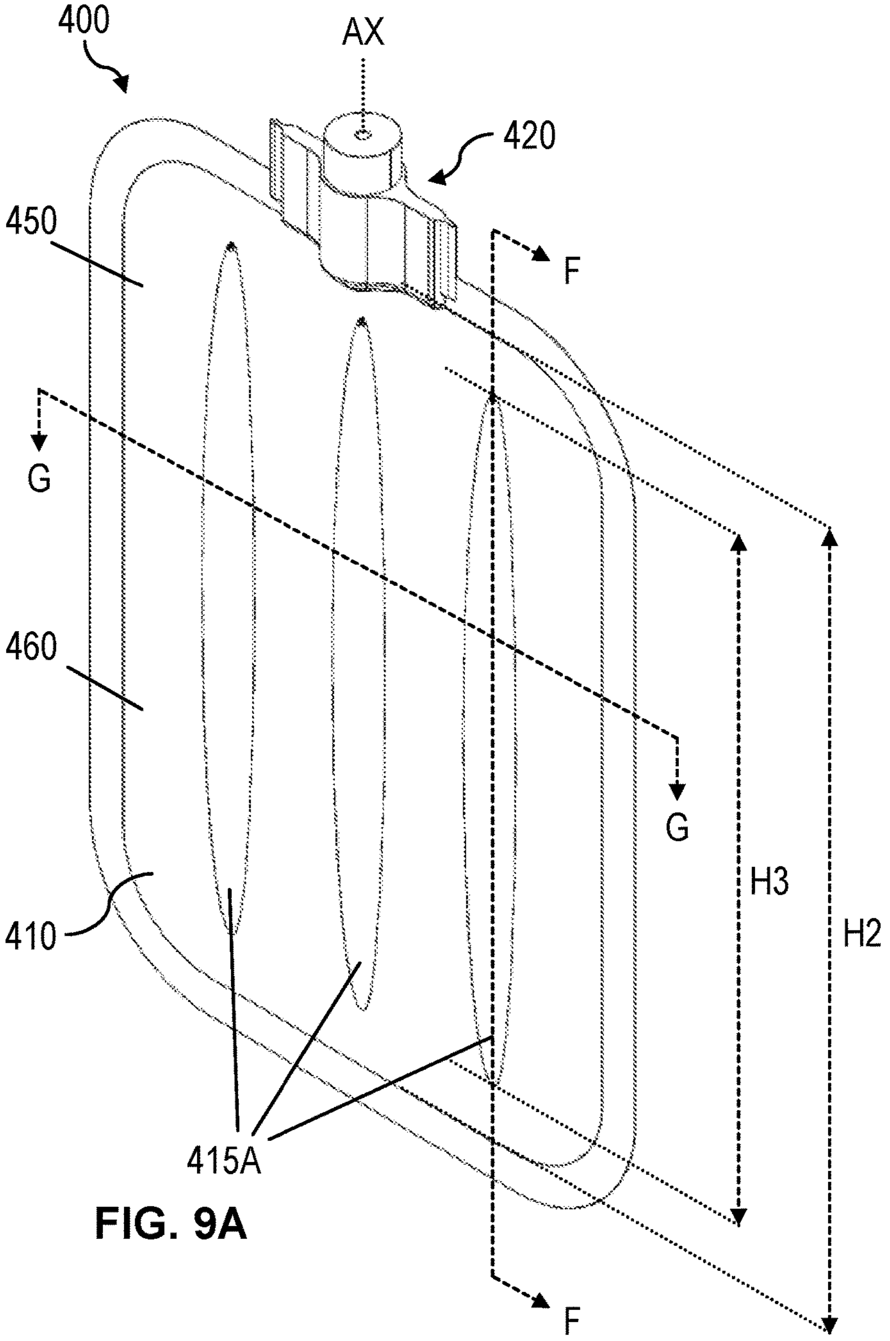
FIG. 9A is a perspective top view of yet another embodiment of a medicament container.

For example, in the illustrative embodiment shown in FIG. 9A, the medicament container 400 includes one or more main ribs 415A formed on the sidewall 410. In some embodiments, the main ribs 415A project into the interior volume of the container 400. In other embodiments, the main ribs 415A project out of the container 400. In some embodiments, a combination of main ribs 415A projecting into and out of the container may be used. In some embodiments, the main ribs 415A may be formed on one face of the sidewall 410. The main ribs 415A may be formed as part of or integral to the sidewall 410, for example with hot embossing or molding means, although any suitable technique may be used to form the main ribs 415A.

In some embodiments, the sidewall 410 may include at least a main rib 415A located centrally on the sidewall 410. The main rib 415A may be elongated such that the longest dimension spans the container height as described above and as shown in FIG. 9A. While the main rib 415A may be positioned at any angle between 0-90°, inclusive, for example 0°, 15°, 30°, 45°, 60°, 75°, or 90° with respect to the central axis AX of the passage at the spout 420, in some embodiments, the longest dimension of the main rib 415A may be aligned with the central axis AX of the passage at the spout 420.

Figure 10:
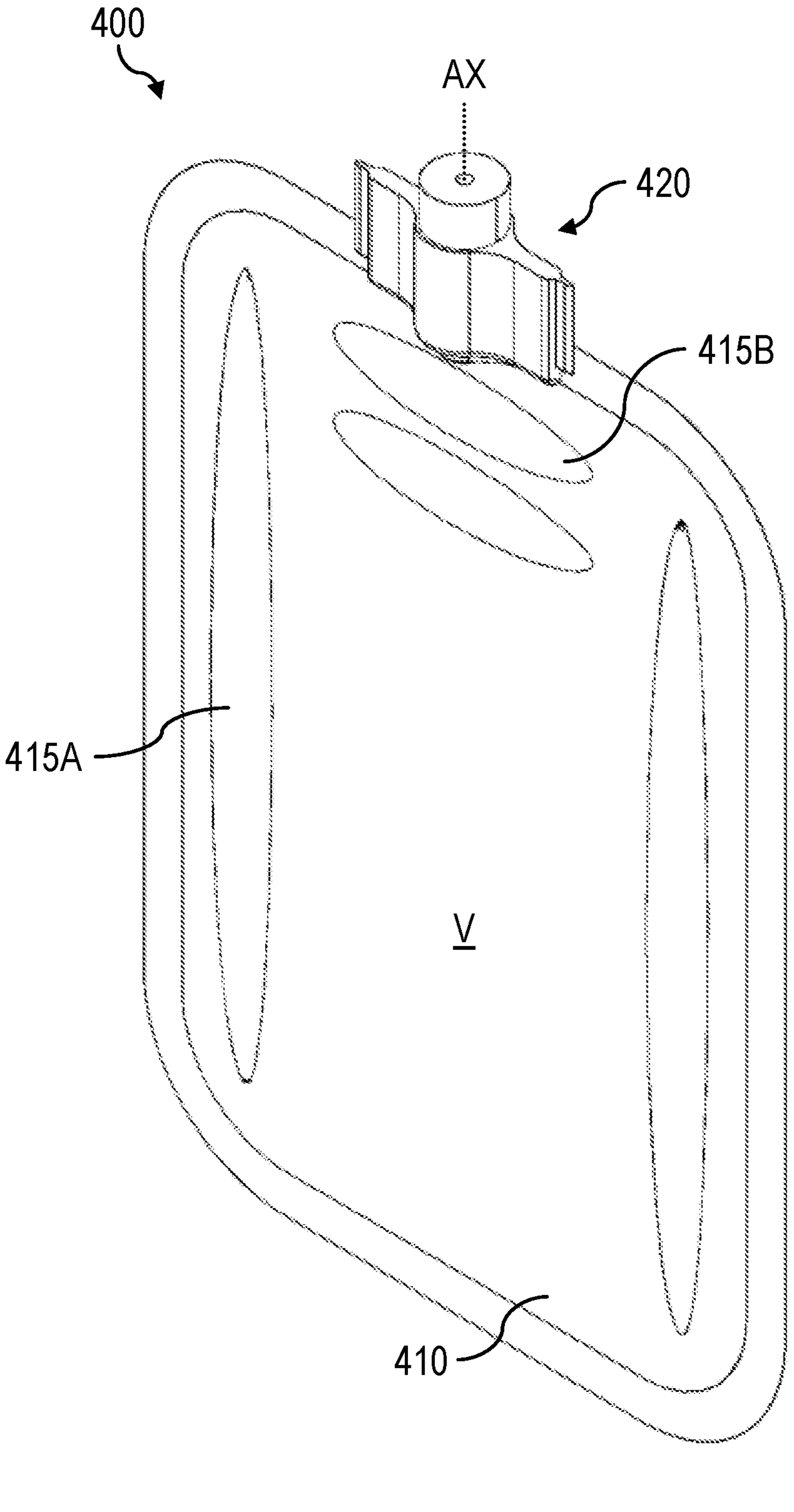
FIG. 10 is a perspective top view of yet another embodiment of a medicament container.

In some embodiments, the container 400 may include at least one auxiliary or second rib 415B positioned at an angle between 0-90°, for example 0°, 15°, 30°, 45°, 60°, 75°, or 90° (as shown in FIG. 10), with respect to the main rib 415A. In some embodiments, the auxiliary rib 415B is smaller than the main rib 415A. In some embodiments, the container 400 may include a plurality of auxiliary ribs 415B and a plurality of main ribs 415A. In an example embodiment shown in FIG. 10, a plurality of short auxiliary ribs 415B lay parallel to one another and perpendicular to a plurality of main ribs 415A distributed on the sidewall 410. Of course, any suitable combination of auxiliary ribs 415B and main ribs 415A may be used as the present disclosure is not so limited.

In some embodiments, the main or auxiliary rib 415A, 415B may project either into or out of the interior volume of the container 400. As described herein, in some embodiments, the main or auxiliary ribs 415A, 415B may be hollow, such that ribs projecting out of the container 400 may allow fluid flow through the ribs 415A, 415B.

Figure 9B:
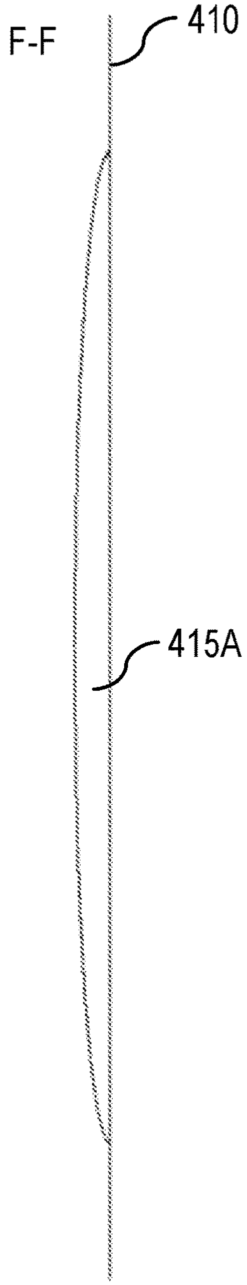
FIG. 9B is a cross-sectional view of the medicament container of FIG. 9A taken along F-F.
Figure 9C:
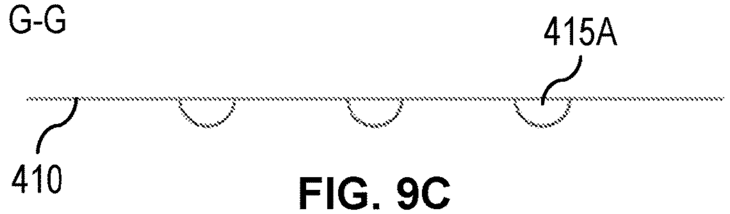
FIG. 9C is a cross-sectional view of the medicament container of FIG. 9A taken along G-G.

While the ribs may have any suitable shape including, but not limited to, polygonal or curved, in some embodiments, the ribs are substantially curved and smooth. In some embodiments, the main or auxiliary ribs 415A, 415B may have a partially elliptical cross-section along its longitudinal axis (e.g. its longest dimension), as seen in FIG. 9B. In some embodiments, the ribs may have a semi-circle cross-section along its lateral dimension, as seen in FIG. 9C. Of course, the ribs 415A, 415B may have any suitable cross-sectional geometry to direct fluid flow in the collapsed state, as the present disclosure is not so limited.

In some embodiments, the container 400 may include one or more portions or regions, including at least a first portion 450 including the spout 420 and a second portion 460 including the distal most edge of the sidewall 410 away from the spout 420. In these embodiments, the one or more ribs 415A may span between the first portion and the second portion. In some embodiments, the longest dimension of the one or more ribs H3 may be greater than one fourth of the sidewall height H2. In some embodiments, the longest dimension of the one or more ribs H3 may be greater than one third of the sidewall height H2. In some embodiments, the longest dimension of the one or more ribs H3 may be greater than one half of the sidewall height H2. In some embodiments, the longest dimension of the one or more ribs H3 may be greater than three fourths of the sidewall height H2. In any embodiment, the longest dimension of the one or more ribs H3 may be any suitable size as the current disclosure is not so limited.

Figure 11:
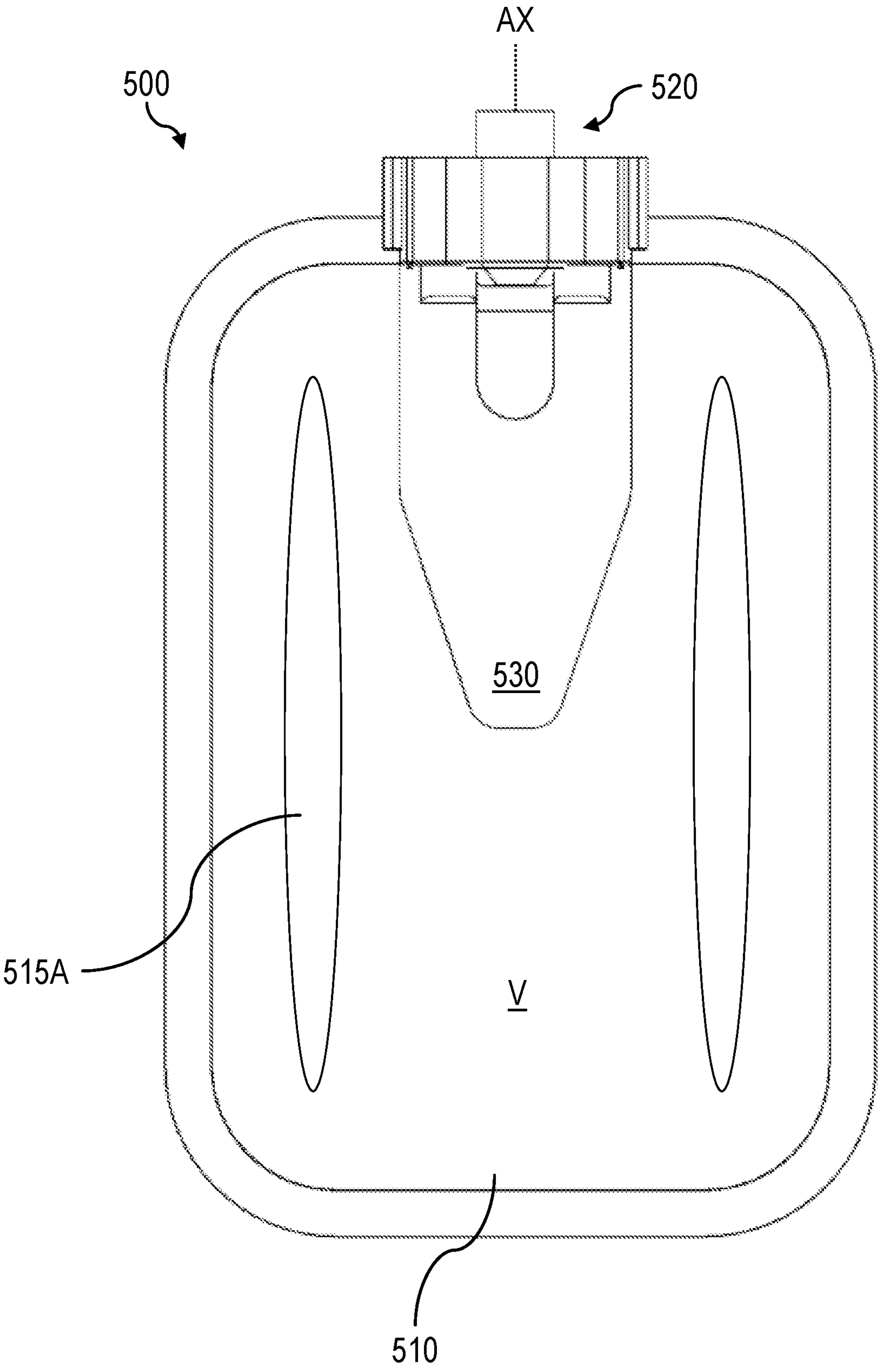
FIG. 11 is a front view of yet another embodiment of a medicament container.
Figure 12:
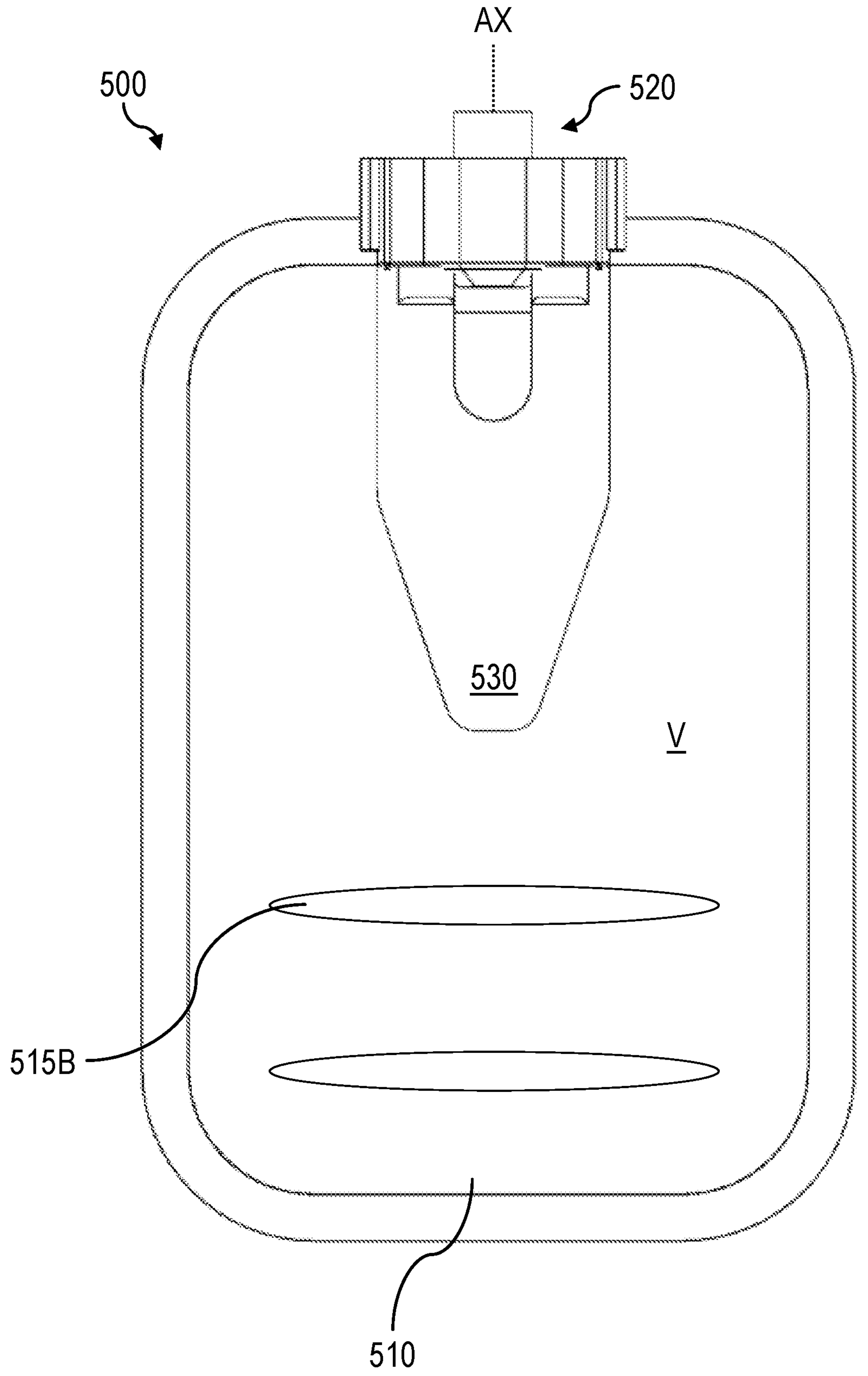
FIG. 12 is a front view of yet another embodiment of a medicament container.

As shown in FIG. 11, in some embodiments, the container 500 may include both an extension 530 and one or more main ribs 515A. In these embodiments, the one or more main ribs 515A may be positioned on the sidewall 510 offset from the central axis AX of the passage at the spout 520. In one example, a container 500 has an extension 530 extending in a direction along the central axis AX and a pair of main ribs 515A located on either side of the extension 530, the main ribs 515A extending in a direction parallel to the central axis AX. In another example, as shown in FIG. 12, a container 500 has an extension 530 extending in a direction along the central axis AX and a pair of auxiliary ribs 515B extending in a direction perpendicular to the central axis AX of the passage. In another example, the ribs may be angled towards in inlet of the passage of the extension 530 to direct fluid flow towards the passage. Of course, any suitable combination of rib location or geometry may be combined with any suitable geometry of the extension, as the present disclosure is not so limited.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

Thus, it should also be appreciated that features described herein as being part of one or more embodiments may be combined with or removed from other embodiments, as the present disclosure invention is not limited to any particular embodiment having any particular feature. Accordingly, the foregoing description and drawings are by way of example only.

What is claimed is:

1. A medicament container comprising:

a sidewall at least partially defining an interior volume of the medicament container;

a spout for outflow of medicament from the interior volume of the medicament container, the spout being coupled to the sidewall; and an extension coupled to the spout and having a pair of opposing faces, the extension being disposed inside the interior volume of the medicament container and including a passage in fluid communication with the interior volume of the medicament container and the spout, the sidewall having a greater flexibility than the extension such that the medicament container has a collapsed state when empty and an expanded state when full, wherein the sidewall is configured to move as medicament flows out of the interior volume of the medicament container through the spout, wherein the extension has a first end adjacent the spout and a second end opposite the first end, the opposing faces of the extension tapering to an edge at the second end, and wherein a height of the extension measured from the first end to the second end along a central axis of the spout is at least one-fourth of a sidewall height, the sidewall height being measured along a dimension parallel to the central axis of the spout when the medicament container is in the expanded state.

2. The medicament container of claim 1, wherein the extension extends centrally along the central axis of the spout.

3. The medicament container of claim 1, wherein the height of the extension is at least one half of the sidewall height.

4. The medicament container of claim 1, the passage extending through the extension from the second end to the first end and having a notched or indented opening at the second end.

5. The medicament container of claim 1, wherein the passage has a fully enclosed interior sidewall.

6. The medicament container of claim 5, wherein the interior sidewall includes at least one opening positioned between the first end and the second end of the extension, and the interior sidewall is in fluid communication with the interior volume of the container through the at least one opening.

7. The medicament container of claim 1, wherein the extension further comprises a plurality of grooves in fluid communication with the passage.

8. The medicament container of claim 1, wherein the sidewall comprises a first rib projecting into the interior volume of the medicament container.

9. The medicament container of claim 1, wherein the sidewall comprises a first rib projecting out of the medicament container.

10. The medicament container of claim 8, wherein the first rib extends parallel to an outflow direction through the spout.

11. The medicament container of claim 8, further comprising a second rib, the second rib extending in a direction at an angle between 0 degrees and 90 degrees relative to an extending direction of the first rib.

12. The medicament container of claim 8, where a cross-section of the first rib taken along a longitudinal axis of the first rib is elliptical.

13. A medicament container comprising:

a sidewall at least partially defining an interior volume of the medicament container;

a spout for outflow of medicament from the interior volume of the medicament container, the spout being coupled to the sidewall; and an extension coupled to the spout, the extension being disposed inside the interior volume of the medicament container and including a passage in fluid communication with the interior volume of the medicament container and the spout, and the sidewall having a greater flexibility than the extension such that the medicament container has a collapsed state when empty and an expanded state when full, wherein the sidewall is configured to move as medicament flows out of the interior volume of the medicament container through the spout, wherein the extension comprises a first portion having a first end and a second portion having a second end, the first end being closer to the spout than the second end is to the spout, the passage having an opening at the second end, and wherein a cross-sectional area of the extension measured normal to a central axis of the spout is greater at the first portion than at the second portion, the cross-sectional area of the second portion decreasing along the central axis moving away from the spout such that the extension tapers towards the second end, the central axis being parallel to an outflow direction through the spout.

14. The medicament container of claim 13, wherein a height of the extension measured along the central axis of the spout is at least one-fourth of a sidewall height, the sidewall height being measured along a dimension parallel to the central axis of the spout when the medicament container is in the expanded state.

15. The medicament container of claim 13, wherein the extension extends centrally along the central axis of the spout.

16. The medicament container of claim 13, wherein the cross-sectional area of the second portion of the extension continuously decreases such that the extension tapers to an edge at the second end of the extension.

17. The medicament container of claim 13, wherein the cross-sectional area of the first portion of the extension is constant from the first end to the second portion of the extension.

18. The medicament container of claim 13, wherein a cross-section of the extension normal to the central axis of the spout is hexagonal at the first end.

19. The medicament container of claim 13, wherein a cross-section of the extension normal to the central axis of the spout is lens-shaped adjacent to the second end.

20. The medicament container of claim 13, wherein the extension further comprises a first edge and a second edge, the first edge disposed on one side of the spout and the second edge disposed on an opposing side of the spout, wherein the first edge and second edge of the first portion of the extension are parallel to the central axis of the spout.

21. The medicament container of claim 13, wherein the extension further comprises a first edge and a second edge, the first edge disposed on one side of the spout and the second edge disposed on an opposing side of the spout, wherein the first edge and second edge of the second portion of the extension are angled with respect to the central axis of the spout at an angle between 0-90°.

22. The medicament container of claim 13, wherein the sidewall comprises a first rib projecting into the interior volume of the medicament container.

23. The medicament container of claim 13, wherein the sidewall comprises a first rib projecting out of the medicament container.

24. The medicament container of claim 22, wherein the first rib extends parallel to an outflow direction through the spout.

25. The medicament container of claim 22, further comprising a second rib, the second rib extending in a direction at an angle of 0 degrees to 90 degrees relative to an extension direction of the first rib.

26. The medicament container of claim 22, where a cross-section of the first rib taken along a longitudinal axis of the first rib is elliptical.

27. The medicament container of claim 13, wherein the opening of the passage at the second end of the extension is indented or notched into the extension.

* * * * *